United States Patent
Amini et al.

(10) Patent No.: US 9,402,199 B2
(45) Date of Patent: Jul. 26, 2016

(54) SYSTEMS AND METHODS FOR WIRELESS LOAD BALANCING AND CHANNEL SELECTION FOR A WIRELESS DEVICE USING WLAN MODULES OPERATING SIMULTANEOUSLY IN DIFFERENT WIRELESS BANDS

(71) Applicant: NETGEAR, INC., San Jose, CA (US)

(72) Inventors: Peiman Amini, Mountain View, CA (US); Joseph Amalan Arul Emmanuel, Cupertino, CA (US); Chia-Wei Liu, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 120 days.

(21) Appl. No.: 14/109,868

(22) Filed: Dec. 17, 2013

(65) Prior Publication Data
US 2015/0103663 A1 Apr. 16, 2015

Related U.S. Application Data

(60) Provisional application No. 61/890,713, filed on Oct. 14, 2013.

(51) Int. Cl.
| | |
|---|---|
| H04J 1/16 | (2006.01) |
| H04W 28/02 | (2009.01) |
| H04W 72/02 | (2009.01) |
| H04W 72/04 | (2009.01) |
| H04B 1/00 | (2006.01) |
| H04W 74/00 | (2009.01) |
| H04L 12/709 | (2013.01) |
| H04L 12/801 | (2013.01) |
| H04W 88/06 | (2009.01) |
| H04W 88/10 | (2009.01) |

(Continued)

(52) U.S. Cl.
CPC ......... *H04W 28/0215* (2013.01); *H04B 1/0053* (2013.01); *H04B 1/0057* (2013.01); *H04L 45/245* (2013.01); *H04L 47/34* (2013.01); *H04W 28/0263* (2013.01); *H04W 72/02* (2013.01); *H04W 72/0453* (2013.01); *H04W 72/0486* (2013.01); *H04W 74/002* (2013.01); H04B 1/005 (2013.01); H04W 80/02 (2013.01); H04W 84/12 (2013.01); H04W 88/06 (2013.01); H04W 88/10 (2013.01)

(58) Field of Classification Search
CPC . H04W 28/0215; H04W 72/02; H04W 84/12; H04W 88/02; H04W 88/023; H04W 88/06; H04W 88/10
See application file for complete search history.

(56) References Cited

U.S. PATENT DOCUMENTS

| | | | |
|---|---|---|---|
| 2002/0012359 A1* | 1/2002 | Kikuchi | H04L 1/0001 370/468 |
| 2005/0220207 A1 | 10/2005 | Perlman et al. | |
| 2006/0223574 A1* | 10/2006 | Chandra | H04W 88/06 455/552.1 |

(Continued)

FOREIGN PATENT DOCUMENTS

| | | |
|---|---|---|
| TW | 2010/10312 | 3/2010 |
| WO | WO-2013/163745 | 11/2013 |

*Primary Examiner* — Kan Yuen
(74) *Attorney, Agent, or Firm* — Perkins Coie LLP; Michael A. Glenn

(57) ABSTRACT

Systems and methods for enabling a WLAN client to communicate simultaneously over more than one band at a time are described, where each client has at least one radio that is operational in each supported band. Load balancing based on traffic requirements optimizes the use of the multiple bands.

20 Claims, 24 Drawing Sheets

(51) Int. Cl.
*H04W 80/02* (2009.01)
*H04W 84/12* (2009.01)

(56) References Cited

U.S. PATENT DOCUMENTS

| | | |
|---|---|---|
| 2006/0251148 A1 | 11/2006 | Welborn et al. |
| 2007/0037603 A1 | 2/2007 | Dravida et al. |
| 2007/0070960 A1 | 3/2007 | Barak et al. |
| 2007/0115825 A1 | 5/2007 | Roberts et al. |
| 2007/0230424 A1 | 10/2007 | Wisherd et al. |
| 2007/0280155 A1 | 12/2007 | Le et al. |
| 2008/0108310 A1 | 5/2008 | Tong et al. |
| 2009/0232053 A1 | 9/2009 | Taki et al. |
| 2010/0208695 A1 | 8/2010 | Youn et al. |
| 2010/0278062 A1 | 11/2010 | Abraham et al. |
| 2011/0134894 A1* | 6/2011 | Stacey .................... H04L 69/14 370/338 |
| 2011/0151875 A1* | 6/2011 | Park .................. H04W 36/0055 455/436 |
| 2011/0158110 A1* | 6/2011 | Stacey .................. H04W 24/00 370/252 |
| 2012/0243449 A1 | 9/2012 | He et al. |
| 2012/0300759 A1* | 11/2012 | Patanapongpibul .. H04W 48/14 370/338 |
| 2013/0064198 A1 | 3/2013 | Krishnaswamy et al. |
| 2013/0077501 A1* | 3/2013 | Krishnaswamy ..... H04L 47/193 370/252 |
| 2013/0238738 A1 | 9/2013 | Yu et al. |
| 2013/0242843 A1 | 9/2013 | Kojima et al. |
| 2013/0322416 A1 | 12/2013 | Son |
| 2014/0016593 A1 | 1/2014 | Park et al. |
| 2014/0254349 A1* | 9/2014 | Jia ......................... H04W 28/04 370/225 |
| 2014/0254494 A1 | 9/2014 | Clegg et al. |
| 2015/0043673 A1* | 2/2015 | Lee ...................... H04B 7/0469 375/267 |

\* cited by examiner

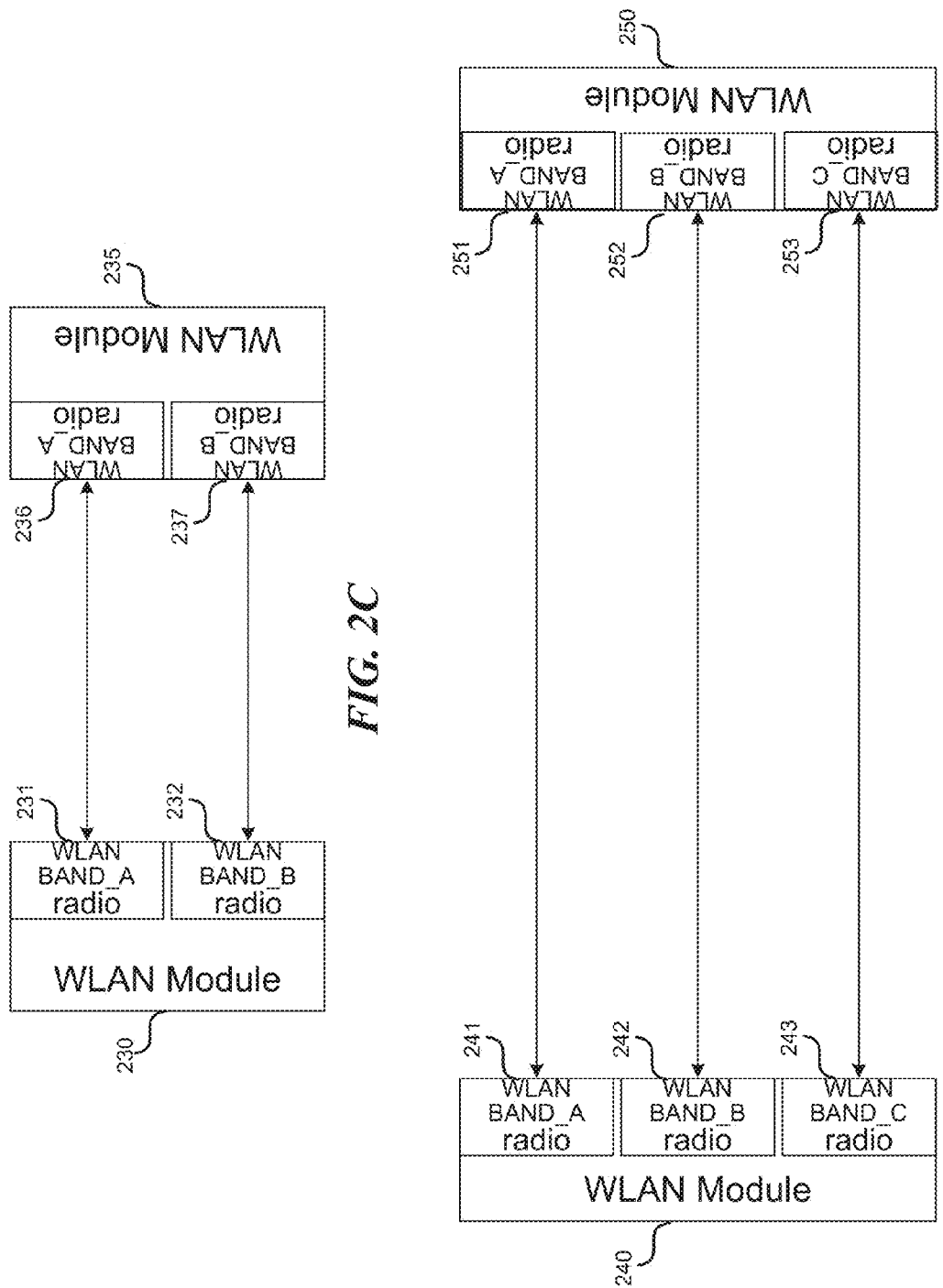

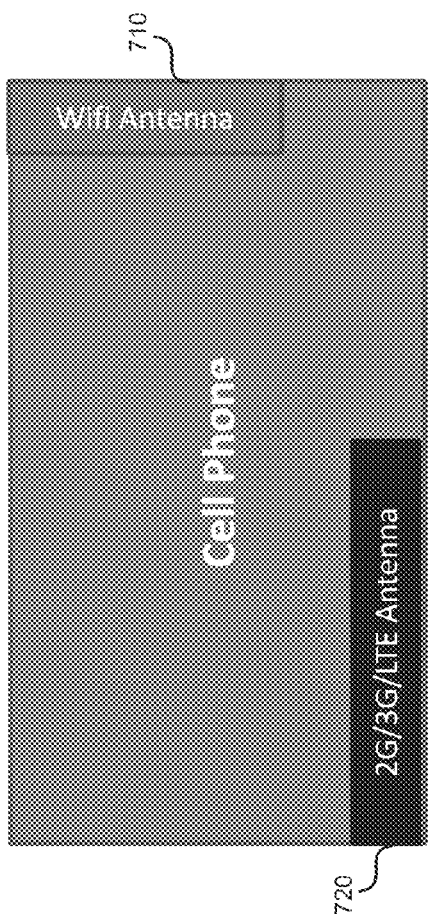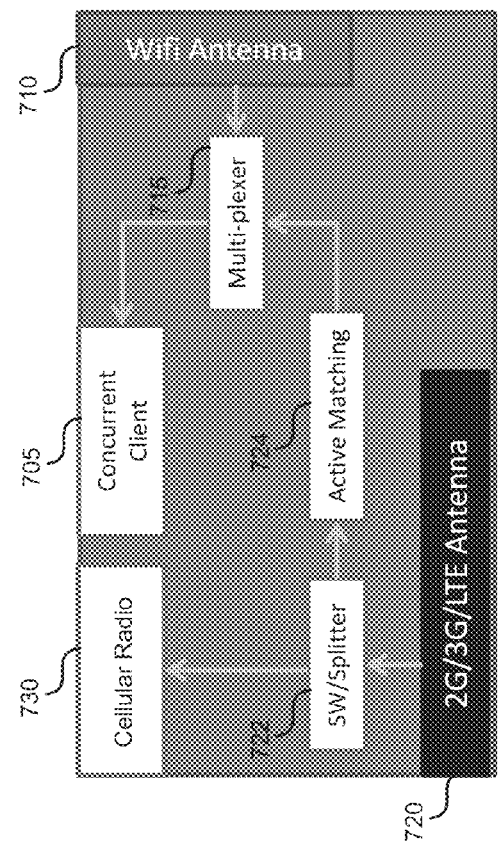
FIG. 7A – Prior Art
FIG. 7B

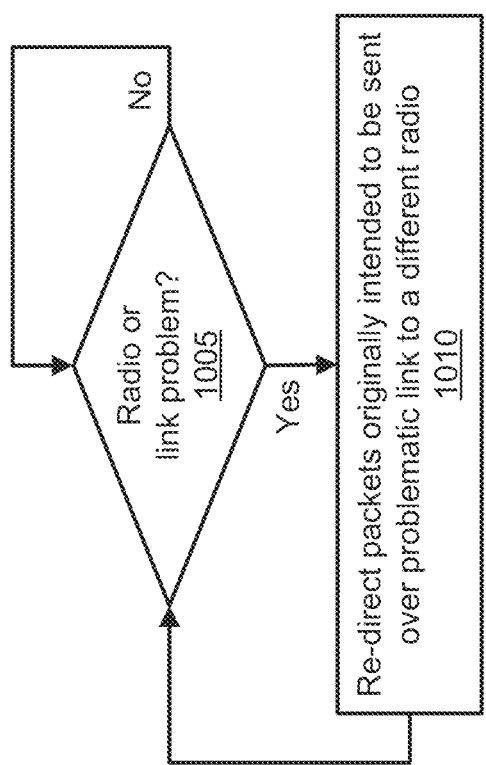

SYSTEMS AND METHODS FOR WIRELESS LOAD BALANCING AND CHANNEL SELECTION FOR A WIRELESS DEVICE USING WLAN MODULES OPERATING SIMULTANEOUSLY IN DIFFERENT WIRELESS BANDS

CROSS-REFERENCES TO RELATED APPLICATIONS

This application claims the benefit of and/or the right of priority to U.S. Provisional Patent Application No. 61/890,713 entitled "SIMULTANEOUS USAGE OF DIFFERENT WLAN MODULES," which was filed on Oct. 14, 2013, the contents of which are incorporated by reference in their entirety herein.

FIELD

The disclosed techniques relate to communications between wireless local area network devices.

BACKGROUND

A wireless local area network (WLAN) client station, such as a cell phone, laptop, and tablet, communicate on a single wireless band at a time with an access point with which the client station is associated. In some instances, a laptop client may be equipped with one or more WLAN radios which are designed to communicate in one of the multiple supported bands, for example, in either the 2.4 GHz band or the 5 GHz band. The conventional client does not use more than one band at a time. Furthermore, the conventional laptop client typically, by default, uses the same band when it subsequently tries to connect to the access point.

Wireless access points may be equipped with one or multiple radios and may be active simultaneously in two or more bands. For example, some access points are active in both 2.4 GHz and 5 GHz bands simultaneously.

SUMMARY

Systems and methods for a wireless device that simultaneously communicates with wireless radios in different bands or two or more wireless radios in the same band are described. When multiple channels and/or bands are available for transmitting wireless traffic by the wireless device, certain factors may be considered for selecting channels and bands to optimize performance of the wireless device, such as the requirements of specific types of traffic to be transmitted, the distance of the recipient of the traffic from the wireless device, the level of interference on the supported channels, the time cost of changing channels, and the received signal strength over the supported channels.

Additionally, there are hardware optimizations to be considered in the design of a wireless device that operates simultaneously over multiple bands or channels. Antenna design to minimize the form factor of the wireless device is important as well as filtering of operational channels and bands from each other to minimize interference and saturation of receivers.

BRIEF DESCRIPTION OF THE DRAWINGS

Examples of a wireless device that can communicate simultaneously over multiple bands with other wireless devices are illustrated in the figures. The examples and figures are illustrative rather than limiting.

FIG. 2C shows a block diagram of two example wireless modules communicating simultaneously over two bands.

FIG. 2D shows a block diagram of two example wireless modules communicating simultaneously over three bands.

FIG. 7A shows a block diagram of antennas used with a cell phone.

FIG. 7B shows a block diagram of antennas used with a simultaneous client.

FIG. 8 is a flow diagram illustrating an example process of a simultaneous client ordering received packets for.

FIG. 10 is a flow diagram illustrating an example process of moving traffic to a different band.

DETAILED DESCRIPTION

Conventional clients in a WLAN network communicate over a single channel in a single band with an access point or a peer in the network. Examples of communication bands include, but are not limited to, the 2.4 GHz and 5 GHz bands used by devices operating under IEEE 802.11 and WFA (Wi-Fi alliance) protocols. However, conventional clients do not currently communicate over more than one band to one or more other wireless devices in the network.

Figure 1A:
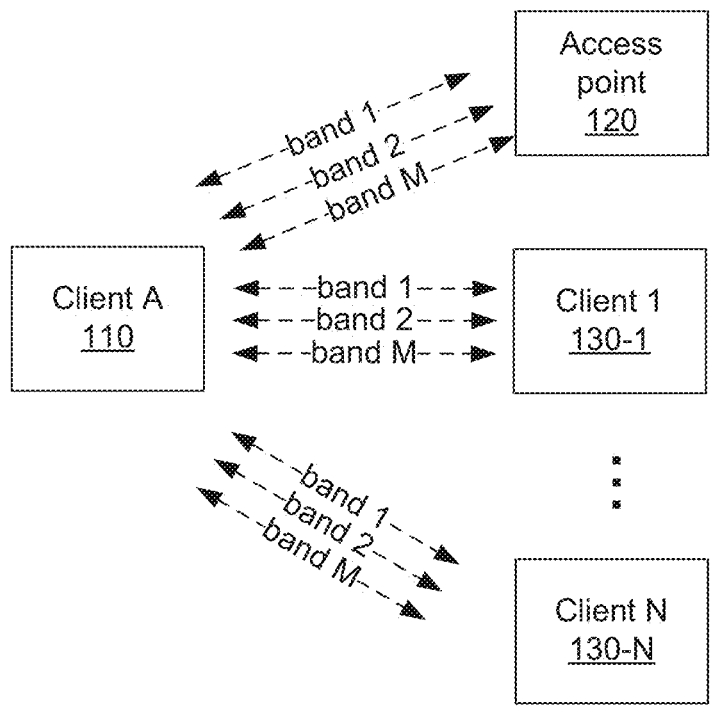
FIG. 1A shows an example system where a wireless client communicates simultaneously over multiple bands with other wireless devices.

FIG. 1A shows an example system where client A 110 can communicate simultaneously over multiple bands with an access point 120 and/or one or more other client devices 130-1 . . . 130-N in a WLAN network. For example, client A 110 can communicate with the access point 120 with which it is associated using one or more channels in one or more bands, such as band 1, band 2, and/or band M. Alternatively, or in addition, client A 110 can simultaneously communicate with one or more peers in the network, client 1 130-1 . . . client N 130-N using one or more channels in one or more bands, such as band 1, band 2, and/or band M. While only three bands, band 1, band 2, and band M are shown, more than three bands can be used simultaneously by client A 110 to communicate with the other wireless devices 120, 130-1 . . . 130-N. To communicate simultaneously over multiple bands, in some embodiments, client A 110 has a separate radio for each band or radio that can be operated simultaneously in one or more or all the bands. In some embodiments, client A 110 can have more than one radio in one or more bands.

Figure 1B:
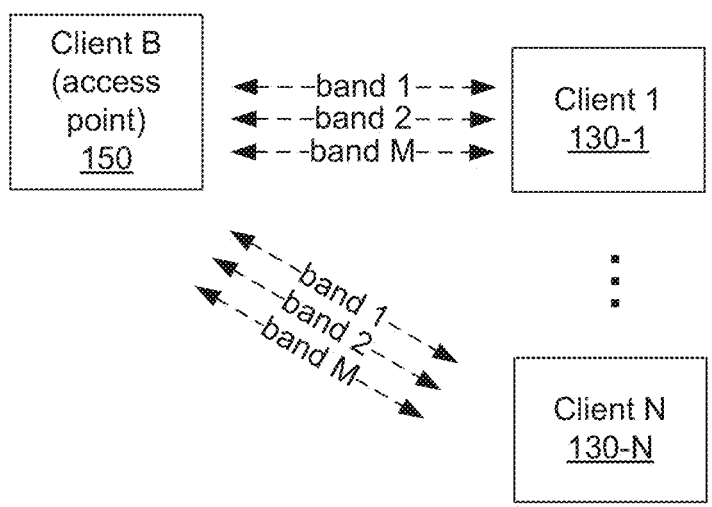
FIG. 1B shows an example system where a wireless device is used as an access point, and the access point communicates simultaneously over multiple bands with other wireless devices.

FIG. 1B shows an example system where client B 150 is configured to operate as an access point. Client B 150 can communicate simultaneously with other wireless devices client 1 130-1 . . . client N 130-N over one or more bands, such as band 1, band 2, and/or band M, and using one or more channels in one or more of the bands. Again, while only three bands, band 1, band 2, and band M are shown, more than three bands can be used simultaneously by client B 150 to communicate with the other wireless devices 130-1 . . . 130-N. To communicate simultaneously over multiple bands, in some embodiments, client B 150 has a separate radio for each band, and in some embodiments, client B 150 can have more than one radio in one or more bands.

One reason for enabling simultaneous communication over multiple bands is to provide a more robust connection between wireless devices. The reliability of communications over wireless channels depends strongly upon the physical environment in which the communication is occurring, and the physical environment and, thus, the characteristics of wireless channels are continuously changing. Moreover, there is no reservation or spectrum assignment for devices in the industrial, scientific, and medical (ISM) bands used for wireless communication; transmitters are only required to follow the Federal Communications Commission's rules regarding maximum power and other emission requirements. Thus, interference may arise from one or more other transmitters operating in a same band as the wireless device. For example, if a client is connected to a home access point, and a microwave oven in the home is turned on, a connection to the access point over the 2.4 GHz band may deteriorate due to interference because the microwave oven has emissions in the 2.4 GHz band. Similarly, baby monitors also operate on the 2.4 GHz band so if a baby monitor is close to a cell phone or an access point, the connection is also likely to deteriorate. Bluetooth devices are another class of wireless devices that may be active in the 2.4 GHz band. Moreover, undesired noise may be emitted in the ISM bands from other devices in the home.

A conventional cell phone has hardware installed that allows it to connect to an access point over the 2.4 GHz band or the 5 GHz band, but not both simultaneously. Further, once the conventional cell phone has made a connection on one of the bands, for example, the 2.4 GHz band, it may not switch to the 5 GHz band because the software may not be sufficiently sophisticated to identify that there is a problem on the 2.4 GHz band and switch over to the 5 GHz band. Even if the cell phone is sufficiently intelligent to switch bands when needed, there may be a transition time between the bands during which the cell phone may not be able to transmit and receive data. However, if a WLAN client such as a cell phone is connected simultaneously on both the 2.4 GHz band and the 5 GHz band, or other bands as described herein, and interference arises from, for example, a baby monitor operating in the 2.4 GHz band in the vicinity of the access point, the cell phone can rely upon communications over a channel in the 5 GHz band, rather than maintaining a noisy connection in the 2.4 GHz band or, perhaps, losing the connection altogether if the connection relies solely on a 2.4 GHz channel Additionally, even if there is no interference on either the 2.4 GHz or 5 GHz bands, by using two connections simultaneously rather than a single connection, the data throughput increases and the round trip time (RTT) may decrease.

Further, an improvement in the communication range of a client that operates simultaneously over different bands can be achieved. For example, with a client that communicates simultaneously over the 2.4 GHz band and the 5 GHz band, on the 5 GHz band, there is more bandwidth available than on the 2.4 GHz band, but the range of transmissions at the 5 GHz band is shorter. So if the client also transmits simultaneously using the 2.4 GHz band, there is an improved range performance because of the greater range available with transmissions in the 2.4 GHz band.

Yet further, communicating simultaneously over multiple bands provides more robustness to wireless communications because packets can be re-transmitted on a different band when a radio operating in a first band is not capable of delivering packets to the intended recipient. For example, if a cell phone has a 5 GHz connection to an access point, as the user of the cell phone moves farther away from the access point, the 5 GHz connection may use lower transmission rates, or it may disconnect due to path loss and drop its wireless signal. But if there is a simultaneous 2.4 GHz connection, the cell phone may rely on the 2.4 GHz connection, which has a greater range, and the user will experience any interruption in service.

While communications over the 2.4 GHz band, for example, using one of the IEEE 802.11 n/b/g protocols and communications over the 5 GHz band, for example, using one of the IEEE 802.11ac/n/a protocols have been mentioned above, other bands can also be used for communication instead of, or in addition to, these bands. These other bands include, for example, the 60 GHz band that follows IEEE 802.11ad protocol, television white spaces (TVWS) having operating frequencies in the very high frequency (VHS)/ultra-high frequency (UHF) bands (i.e., IEEE 802.11 of or others), (e.g., 470 MHz-790 MHz in Europe and 54 MHz-698 MHz in the United States), and the sub-1 GHz ISM bands, using the IEEE 802.11ah protocol, whose exact ranges may by country-dependent.

In some embodiments, WLAN modules may have multiple radios that are active simultaneously in a particular band, and/or some WLAN modules may have multiple radios active simultaneously in different bands. The WLAN module may also include a radio which can be simultaneously active in more than one channel in one band and/or more than one band. Examples of clients that these WLAN modules may be used with include desktop computers, laptops, tablets, netbooks, work stations, cellular devices, televisions, entertainment centers, satellite communication devices, and other forms of computing devices.

Figure 2B:
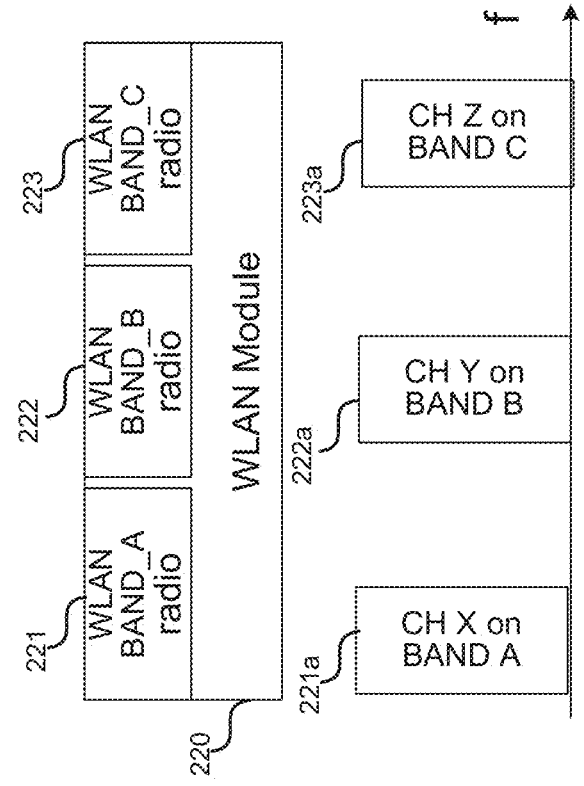
FIG. 2B shows a block diagram of an example wireless module communicating simultaneously over three bands.
Figure 2A:
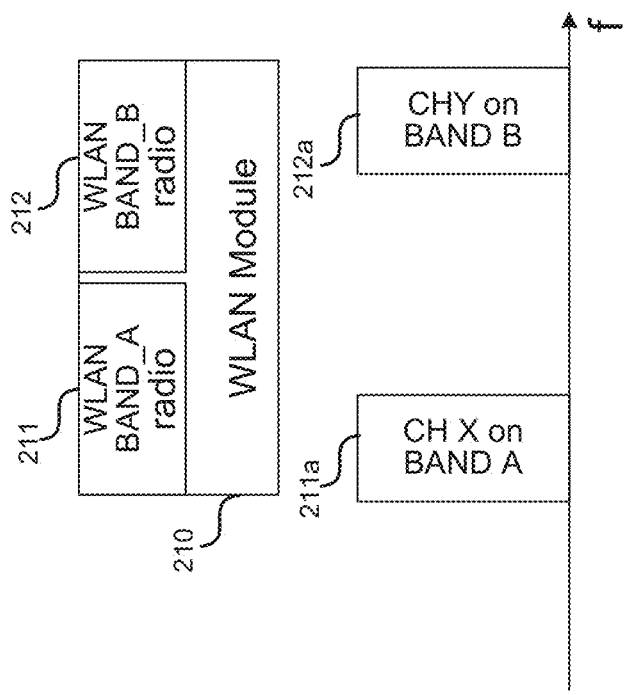
FIG. 2A shows a block diagram of an example wireless module communicating simultaneously over two bands.

FIGS. 2A-2E describe example implementations for client A 110 or client B 150. FIG. 2A shows a block diagram of an example dual-band wireless module 210, using radio 211 to communicate over band A and radio 212 to communicate over band B. FIG. 2A shows that the wireless module 210 communicates on channel X in band A 211a and also on channel Y in band B 212a simultaneously, where band A 211a and band B 212a cover different frequency ranges. The WLAN module 210 can be used as an access point or a soft access point. When the WLAN module acts as a soft access point, the WLAN module has dual roles; the WLAN module is a client station with respect to another access point, and also performs the role of an access point for another wireless device. In some embodiments, the wireless module described throughout this description can be implemented as one or more chipsets. A wireless module that communicates simultaneously over two or more bands is called a simultaneous client or concurrent client.

FIG. 2B shows a block diagram of an example tri-band wireless module or simultaneous client 220 that communicates simultaneously over three different bands, using radio 221 to communicate over band A, radio 222 to communicate over band B, and radio 223 to communicate over band C. FIG. 2B shows that simultaneous client 220 communicates simultaneously on channel X in band A 221a, on channel Y in band B 222a, and on channel Z in band C 223a, where band A 221a, band B 222a, and band C 223a cover different frequency ranges. The functionality of radios 221, 222, and 223 may be combined into one radio to support multiple channels in multiple bands.

FIG. 2C shows a block diagram of example communications between two dual-band simultaneous clients 230, 235. Simultaneous client 230 uses radio 231 to communicate over band A and radio 232 to communicate over band B, while simultaneous client 235 uses radio 236 to communicate over band A and radio 237 to communicate over band B. In the example of FIG. 2C, simultaneous client 230 uses radio 231 to communicate over band A with radio 236 of simultaneous client 235, and radio 232 to communicate over band B with radio 237 of simultaneous client 235. Communication over the two bands, band A and band B, between clients 230, 235 can occur at the same time. In some embodiments, one of the simultaneous clients can be a multi-band router.

FIG. 2D shows a block diagram of example communications between two tri-band simultaneous clients 240, 250. Simultaneous client 240 uses radio 241 to communicate over band A, radio 242 to communicate over band B, and radio 243 to communicate over band C. Simultaneous client 250 uses radio 251 to communicate over band A, radio 252 to communicate over band B, and radio 253 to communicate over band C. In the example of FIG. 2D, simultaneous client 240 uses radio 241 to communicate over band A with radio 251 of simultaneous client 250, radio 242 to communicate over band B with radio 252 of simultaneous client 250, and radio 243 to communicate over band C with radio 253 of simultaneous client 250. Communication over the three bands, band A, band B, and band C, between clients 240, 250 can occur at the same time.

Figure 2E:
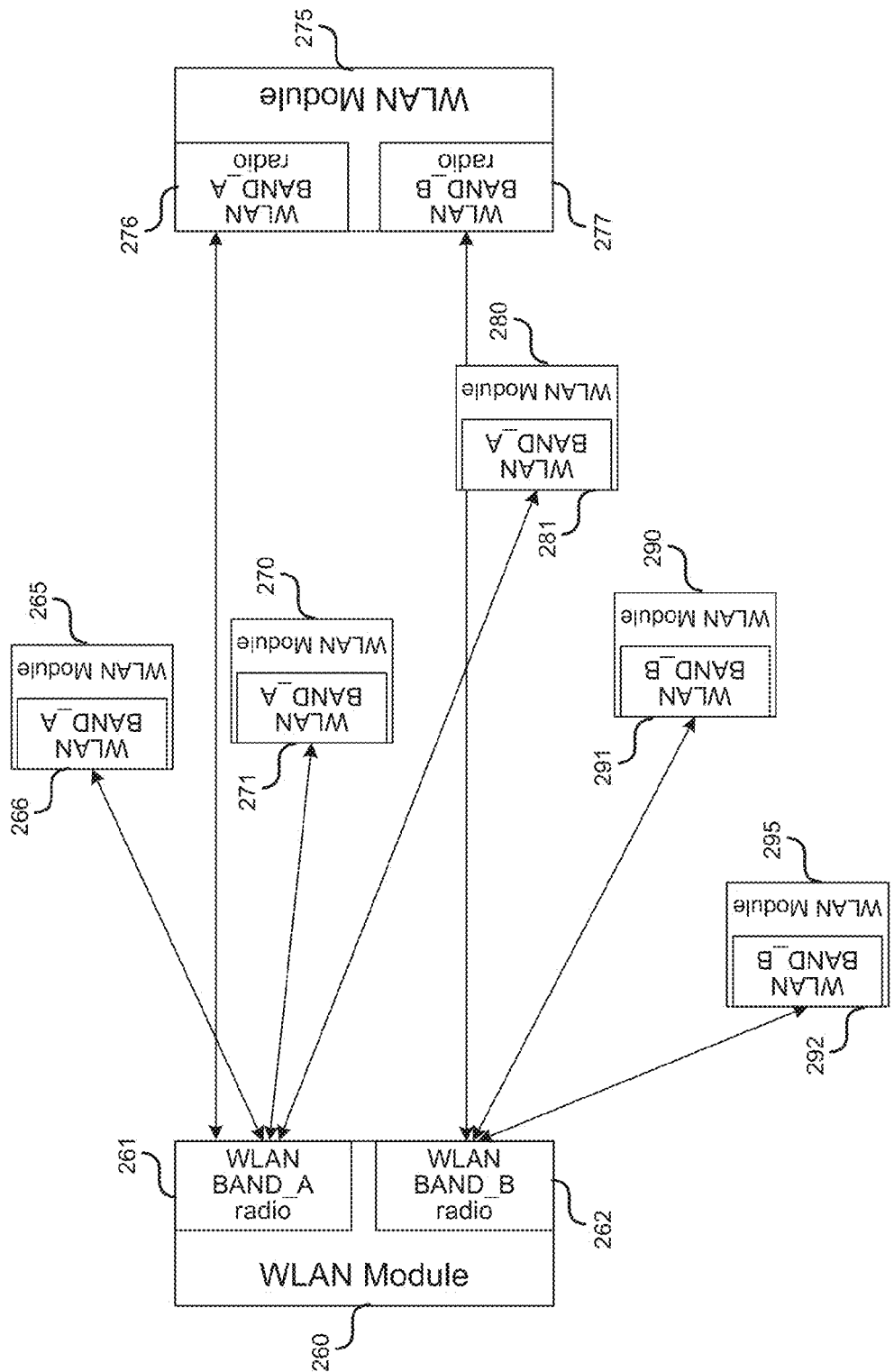
FIG. 2E shows a block diagram of an example wireless module communicating simultaneously over two bands to multiple other wireless devices.

FIG. 2E shows a block diagram of an example simultaneous client 260 communicating simultaneously over two bands to multiple other wireless devices 265, 270, 275, 280, 290, and 295. Simultaneous client 260 uses radio 261 to communicate over band A and radio 262 to communicate over band B. Simultaneous client 275 having radio 276 for communicating over band A and radio 277 for communicating over band B can communicate with simultaneous client 260 over bands A and B at the same time, as discussed for the example shown in FIG. 2C. Clients 265, 270, 280, 290, 295 are not simultaneous clients. Clients 265, 270, and 280 each have a respective radio 266, 271, and 281 used to communicate over band A, and clients 290, 295 each have a respective radio 291, 292 used to communicate over band B. Simultaneous client 260 can communicate with conventional non-simultaneous clients 265, 270, 280, 290, 295 while also communicating with simultaneous client 275. To communicate with multiple wireless devices 265, 270, 275, 280, 290, and 295 at the same time, the simultaneous client 260 can multiplex packet exchanges in time and/or frequency.

Figure 2F:
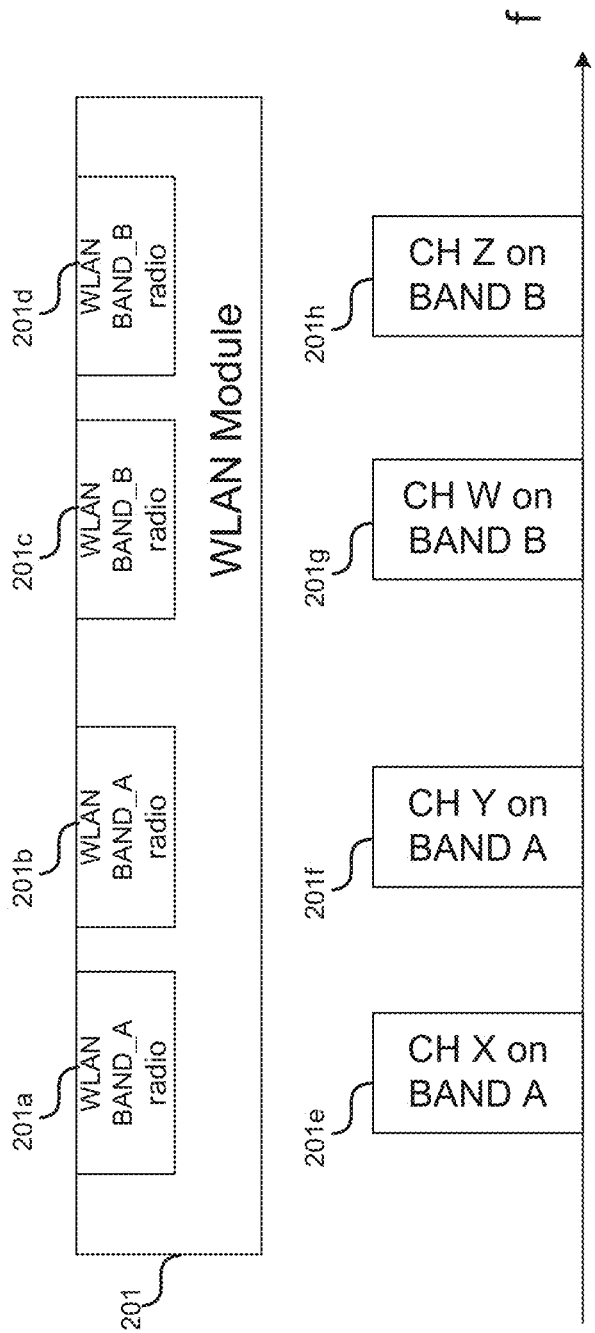
FIG. 2F shows a block diagram of an example wireless module communicating simultaneously over two bands, and on two channels within each of the two bands.

FIG. 2F shows a block diagram of an example simultaneous client 201 communicating simultaneously over multiple channels in each of two bands. In particular, simultaneous client 201 uses radios 201a, 201b to communicate on channel X in band A 201e and on channel Y in band A 201f, respectively, and uses radios 201c, 201d to communicate on channel W in band B 201g and on channel Z in band B 201h, respectively.

Figure 2G:
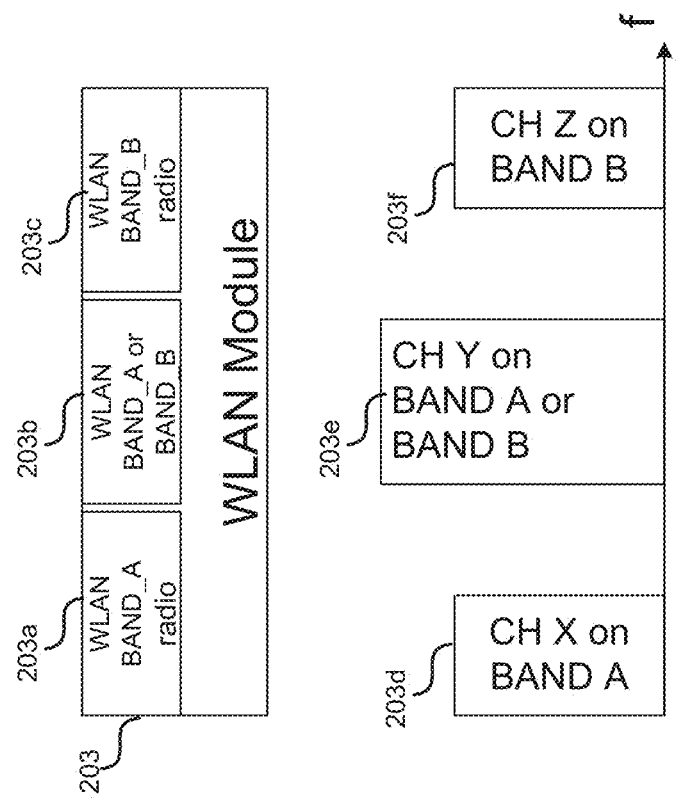
FIG. 2G shows a block diagram of an example wireless module communicating simultaneously over two bands, where one of the radios is reconfigurable.

FIG. 2G shows a block diagram of another example simultaneous client 203 communicating simultaneously over two bands. In particular, simultaneous client 203 uses radio 203a to communicate on channel X in band A 203d, and uses radio 203c to communicate on channel Z in band B 203f. Radio 203b is reconfigurable to operate at any frequency in the bands of operation, band A and band B. Thus, radio 203*b* can be reconfigured to communicate on channel Y 203*e* over either band A or band B.

Figure 2H:
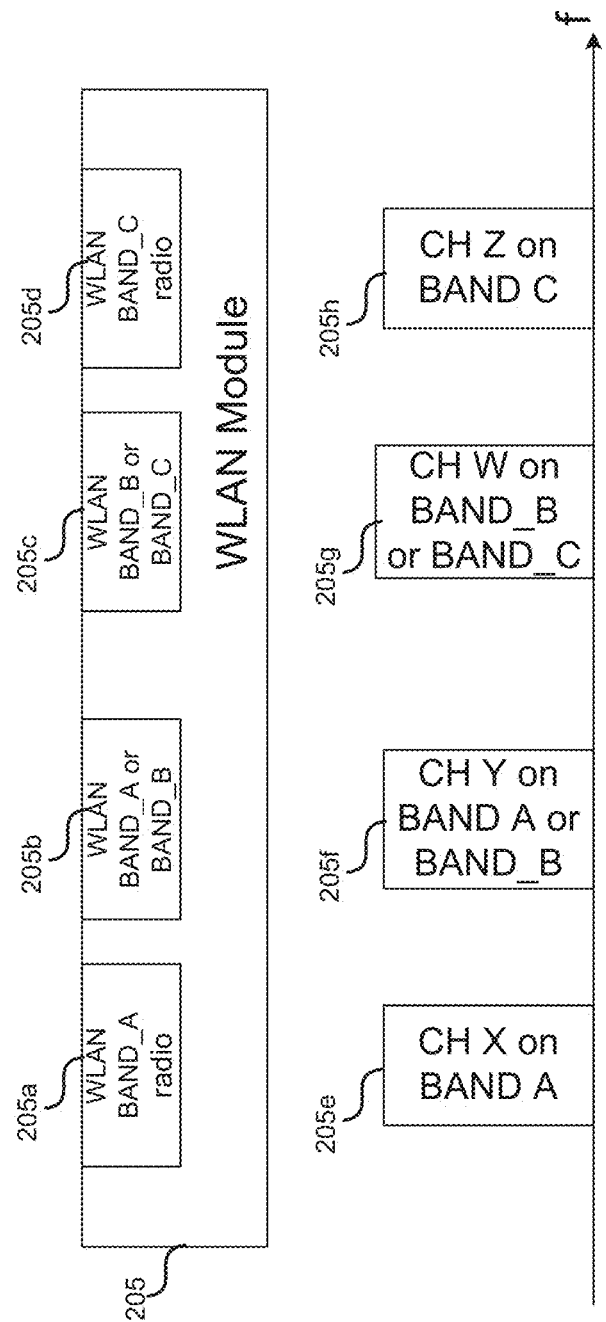
FIG. 2H shows a block diagram of an example wireless module communicating simultaneously over three bands, where two of the radios are reconfigurable.

FIG. 2H shows a block diagram of an example simultaneous client 205 communicating simultaneously over three bands. In particular, simultaneous client 205 uses radio 205*a* to communicate on channel X in band A 205*e*, and uses radio 205*d* to communicate on channel Z in band C 205*h*. Radio 205*b* is reconfigurable to communicate on channel Y over either band A or band B 205*f*, and radio 205*c* is reconfigurable to communicate on channel W over either band B or band C 205*g*.

Any of the different configurations for the WLAN module, such as shown in FIGS. 2A-2G, can be used as an access point.

A simultaneous client may operate in a multiple input and multiple output (MIMO) mode in the two or more bands over which it is communicating. For example, the simultaneous client can operate in a N×N MIMO mode, where N is an integer, and up to N independent data streams can be transmitted at the same time, and up to N independent data streams can be received at the same time. Thus, for an N×N wireless module, the module can use N or more antennas to transmit each data stream, and N or more antennas to receive each data stream. If an antenna is multi-band, the same antenna may be used for multiple bands. If antennas are single band, different antennas may be used for different bands, Details pertaining to multi-band antennas are discussed further below.

A simultaneous client may also use different bandwidths for the bands selected for operation, such as 20 MHz, 40 MHz, 80 MHZ, 5 MHz, 10 MHz, 1 MHz, 2 MHz, 4 MHz, 6 MHz, 8 MHz, and 16 MHz.

In some embodiments, a WLAN module can be designed as a client module, soft access point, repeater, or to use the Wi-Fi Direct standard, a tunneled direct link setup (TDLS), or to operate in any other IEEE 802.11 or Wi-Fi mode. In some embodiments, the WLAN module can be used an access point.

Connections to the WLAN Modules

A simultaneous client module can be used as an internal device within a client device, such as a laptop or cellular phone. Alternatively, the simultaneous client module can be used as an external device that is designed to attach to one of the ports of the client device, such as via a USB (universal serial bus) dongle or an Ethernet dongle. With the example connections to the WLAN modules shown in FIGS. 3A-3C, the WLAN modules can be used as either an internal or external device.

Figure 3A:
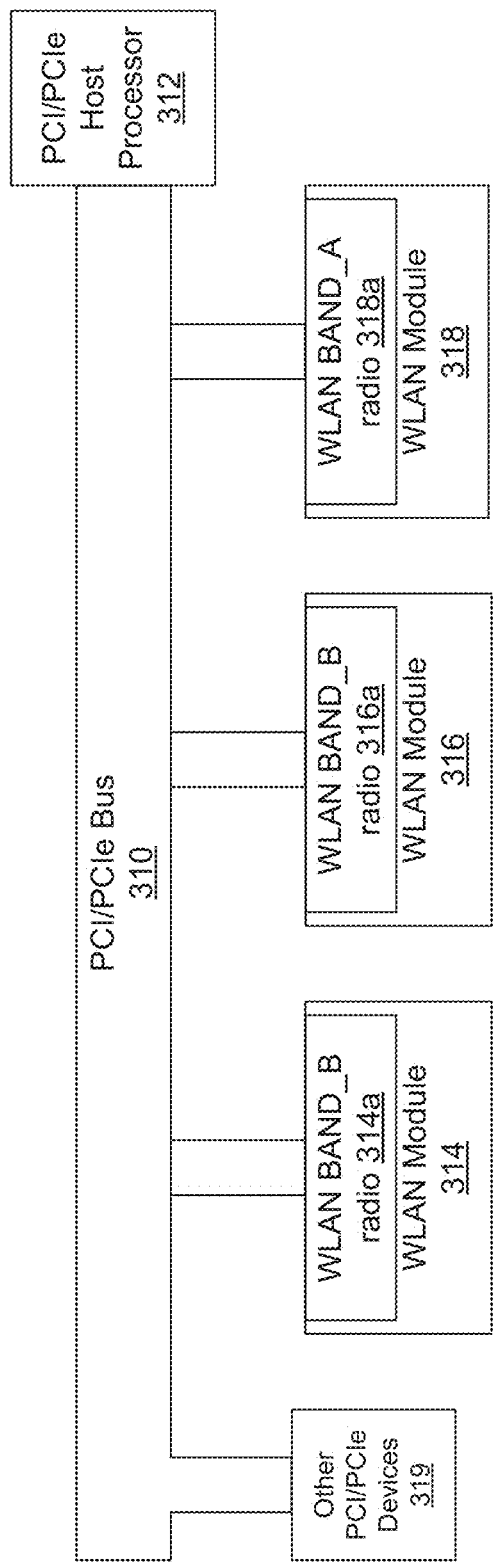
FIG. 3A shows a block diagram depicting a PCIe bus connecting multiple WLAN modules to a host processor.

Many laptops use a peripheral component interconnect (PCI) or peripheral component interconnect express (PCIe) local computer bus for connecting devices to the laptop host processor. FIG. 3A is a block diagram depicting an example connection between multiple WLAN modules 314, 316, 318 and the host processor 312 of the client device via a PCIe or PCI bus 310. The PCI or PCIe bus 310 is shared by other PCI/PCIe devices 319 connected to the host processor 312. Alternatively, the bus 310 can be any other type of bus, such as USB, high speed inter-chip (HSIC), serial ATA (advanced technology attachment), Ethernet, SPI/I²C (serial peripheral interface/inter-integrated circuit), and FireWire. Although not shown explicitly in FIG. 3A, the functions of a simultaneous client processor can be a dedicated processor connected to the PCI/PCIe bus 310. In some embodiments, the functions performed by the simultaneous client processor can be distributed in any fashion among a dedicated simultaneous client processor, processors in the WLAN modules 314, 316, 318, and the host processor 312.

Figure 3B:
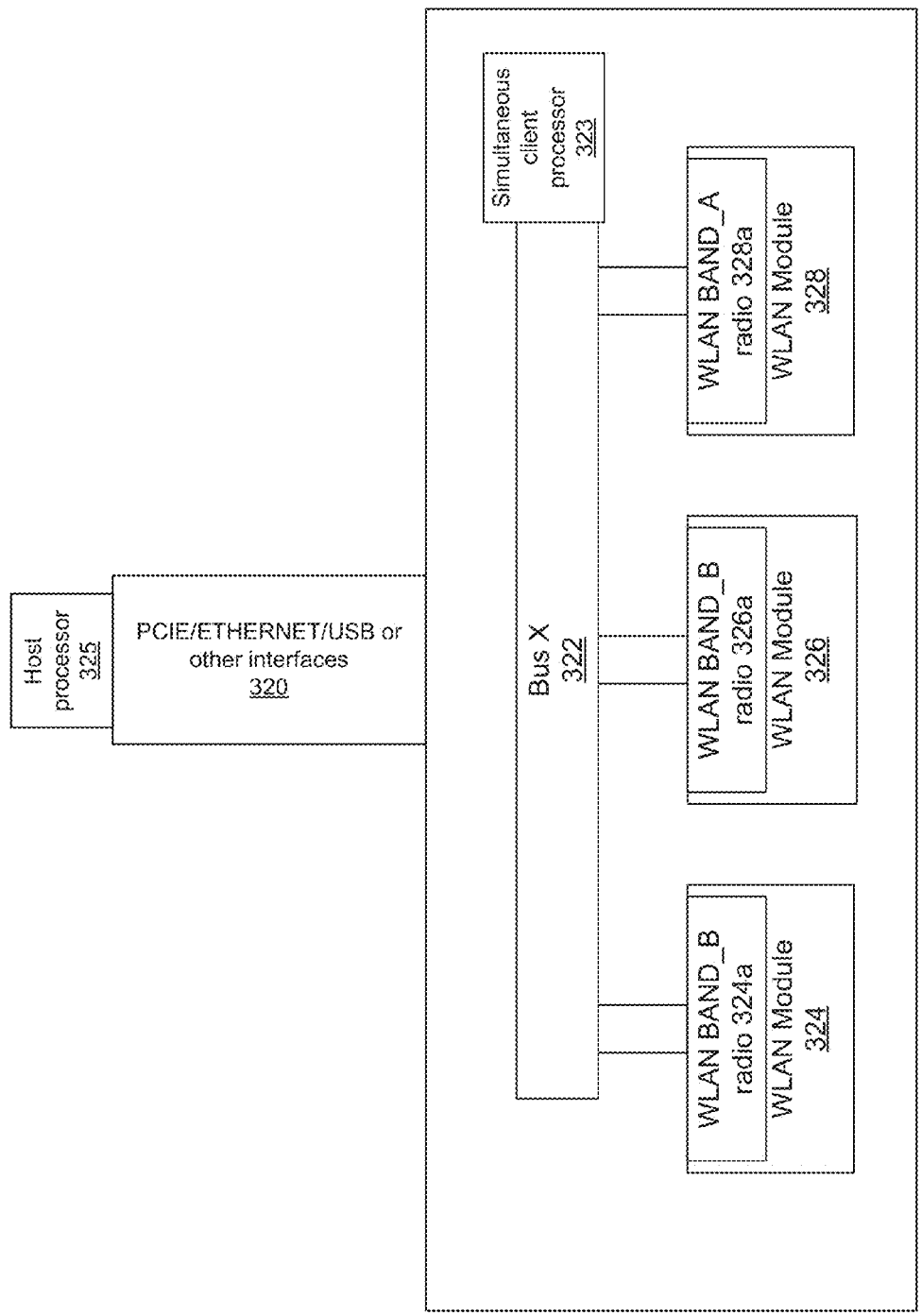
FIG. 3B shows a block diagram depicting an alternative example connection between the host processor and multiple WLAN modules.

FIG. 3B is a block diagram depicting an alternative example connection between the host processor 325 and the multiple WLAN modules 324, 326, 328 used to communicate at multiple convenient bands, for example, band A 328*a* and band B 324*a*, 326*a*. There is one data bus 320 that connects a host processor 325 to the M-module that includes the WLAN modules 324, 326, 328 and the simultaneous client processor 323. The data bus 320 can be any type of data bus, such as PCIe, HSIC, USB Ethernet, or USB. Within the M-module there is an interconnect 322 that connects the different WLAN modules 324, 326, 328 and the simultaneous client processor 323. Although the simultaneous client processor 323 is shown as a single processor in the example of FIG. 3B, the simultaneous client processor functions can be distributed in any fashion among the various WLAN modules 324, 326, 328, the simultaneous client processor 323, and the host processor 325.

Figure 3C:
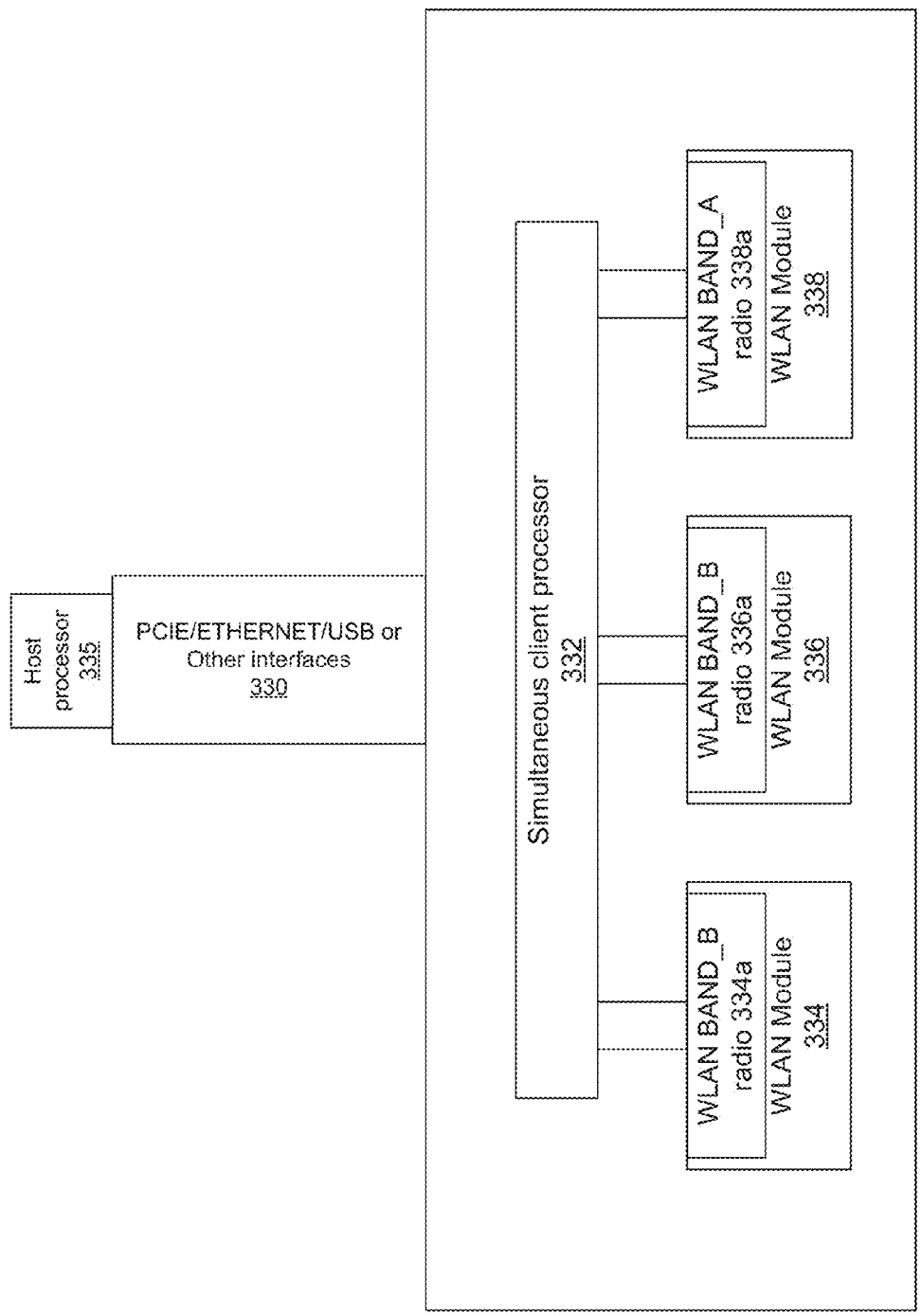
FIG. 3C shows a block diagram depicting yet another alternative example connection between the host processor and multiple WLAN modules.

FIG. 3C is a block diagram depicting an alternative example connection between the host processor 335 and the multiple WLAN modules 334, 336, 338 used to communicate at multiple convenient bands, for example, band A 338*a* and band B 334*a*, 336*a*. Similar to the example connection depicted in FIG. 3B, there is one data bus 330 that connects a host processor 335 to a simultaneous client processor 332 inside the M-module. The data bus 330 can be any type of data bus, such as PCIe, Ethernet, or USB. Within the M-module, the simultaneous client processor 332 is directly connected to and communicates with the different WLAN modules 324, 326, 328. The host processor 335 and the WLAN modules 334, 336, 338 share part of a memory, such as a random access memory, where control and data packets can be exchanged.

Although the simultaneous client processor 332 is shown as a single processor in the example of FIG. 3C, the simultaneous client processor functions can be distributed in any fashion among the various WLAN modules 334, 336, 338, the simultaneous client processor 332, and the host processor 335. The simultaneous client processor 332 and WLAN modules 334, 336, 338 can be situated on a printed circuit board (PCB) that is used in a laptop or cell phone, or they could be integrated in a chipset. For the case of an external device, the simultaneous client processor 332 and WLAN modules 334, 336, 338 can be placed inside a physical box that houses a USB or Ethernet dongle.

Simultaneous Client Processor

Figure 4:
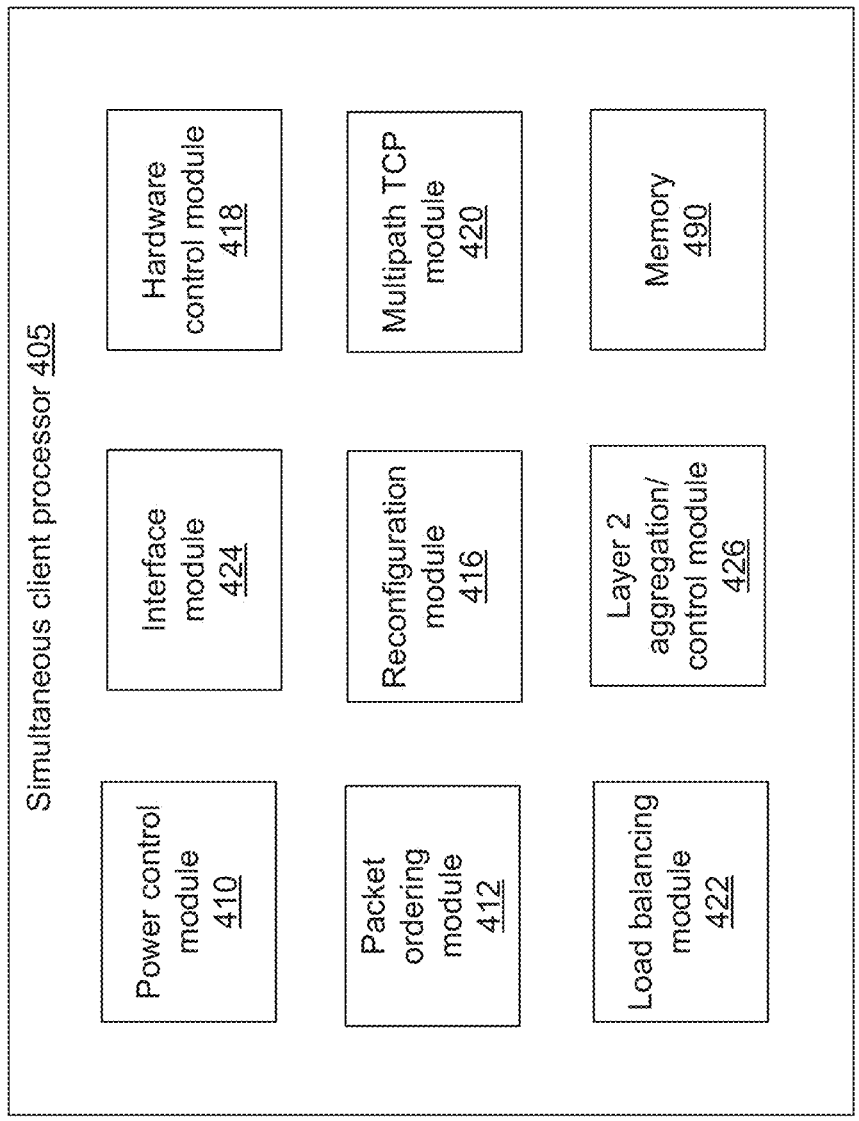
FIG. 4 shows an example of an architecture of a functional simultaneous client processor.

FIG. 4 is an example of an architecture of a functional simultaneous client processor 405 configured, for example, to distribute or multiplex packets between different bands on the transmitter side, and de-multiplex and re-order the packets, as needed, on the receiver side. In the example of FIG. 4, the functional simultaneous client processor 405 includes a packet ordering module 412, an interface module 424, a multipath TCP module 420, a load balancing module 422, a reconfiguration module 416, a hardware control module 418, a power control module 410, a layer 2 aggregation/control module 426, and/or a memory 490.

The modules of the functional processor used for operating a simultaneous client can run on one or more processors in individual WLAN modules, on a dedicated simultaneous client processor, or on the host processor. In some embodiments, the modules of the functional processor, or even sub-portions of the modules of the functional processor can be distributed among the host processor, a dedicated simultaneous client processor, and/or any of the one or more processors in individual WLAN modules.

The functional processor 405 and all of the elements included within the functional processor 405 are implemented by using programmable circuitry programmed by software and/or firmware, or by using special-purpose hard-wired circuitry, or by using a combination of such embodiments. Additional or fewer elements can be included in the functional processor 405 and each illustrated component. As used herein, a "module" of the functional processor 405 includes a general purpose, dedicated or shared processor and, typically, firmware or software modules that are executed by the functional processor 405. Some parts of the functionalities may be integrated in hardware as well. Depending upon implementation-specific or other considerations, the module can be centralized or its functionality distributed. The module can include general or special purpose hardware, firmware, or software embodied in a computer-readable (storage) medium for execution by the functional simultaneous client processor 405.

Some embodiments of the functional processor 405 include the packet ordering module 412 which reads header information in received packets and orders them appropriately. If packets are not ordered appropriately when received, packets transmitted over different bands may arrive in a different order from which they were transmitted. For example, if packets 1, 3, and 5 are sent over band A to the simultaneous client, and packets 2 and 4 are sent over band B, packet 4 may arrive before packet 3, thus resulting in a mis-ordered sequence of packets because transmission times for packets over different bands may not be the same. When the simultaneous client is communicating over more than one channel or band at a time with another wireless device, packets can be received on any of the channels from the other device, depending upon the method that the transmitter is using to send the packets.

Figure 8:
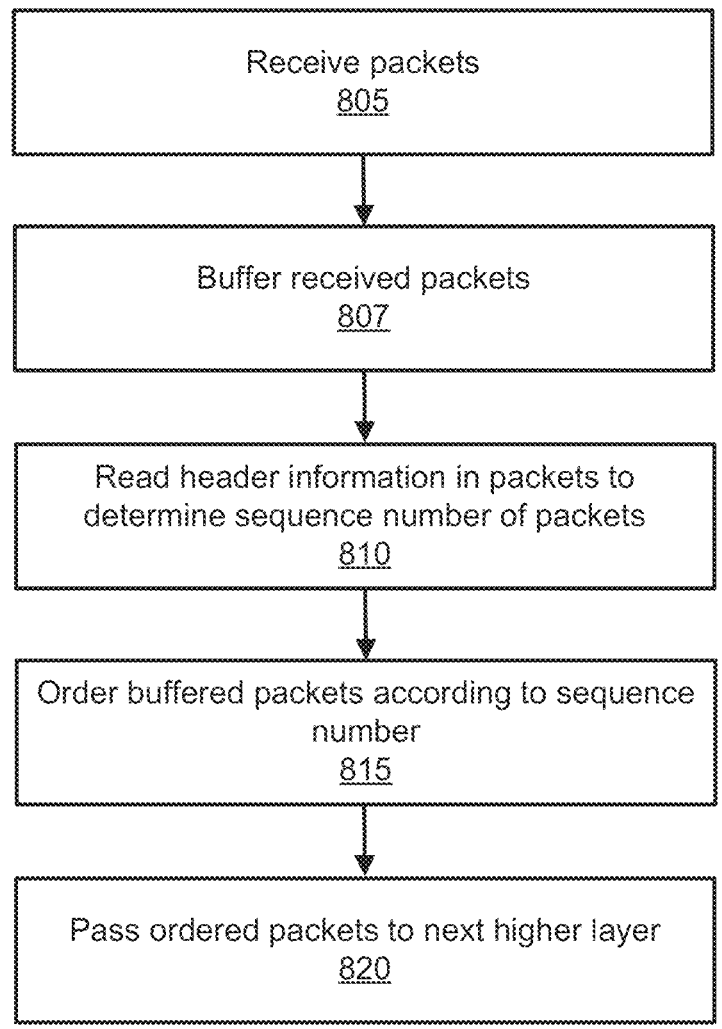

FIG. 8 is a flow diagram illustrating an example process of a simultaneous client ordering received packets for re-transmission. At block 805, the packet ordering module 412 receives the transmitted packets and buffers the packets at block 807. Then at block 810, the packet ordering module 412 reads the header information in the packets to determine a sequence number of the received packets. Next, at block 815, based upon the determined sequence numbers, the packet ordering module 412 orders the packets appropriately. Subsequently, at block 820, the packet ordering module 412 passes the appropriately ordered packets to internet protocol (IP) in layer 3 of the OSI (Open Systems Interconnection) model of computer networking or equivalent layer(s) in other implementations. In other words, whichever layer is implementing the packet ordering, the order packets are passed to the next layer above it. In some embodiments, when packets are transmitted by a simultaneous client, sequencing information may be inserted in the header of transmitted packets so that the recipient of the packets can used the sequencing information to appropriately order the received packets. In some embodiments, the ordering may be performed in the TCP (transmission control protocol) or the application layer.

Some embodiments of the functional processor 405 include an interface module 424 that determines whether a wireless device to which the simultaneous client is communicating is capable of operating as a simultaneous client. For example, if the simultaneous client associates with an access point, and the access point is a legacy access point, the access point does not know that the simultaneous client is communicating over multiple bands, and thus, may not appropriately order received packets, resulting in communication problems. In such scenarios, the functional processor 405 may rely on the ordering capability of a server, or the functional processor 405 may use the multiple communication links over different channels and/or bands in a way that ordering is not required. For example, the functional processor 405 can use each link for a different application, and the functional processor 405 may run separate instances of TCP/IP (internet protocol) for each radio link in some applications.

Figure 11A:
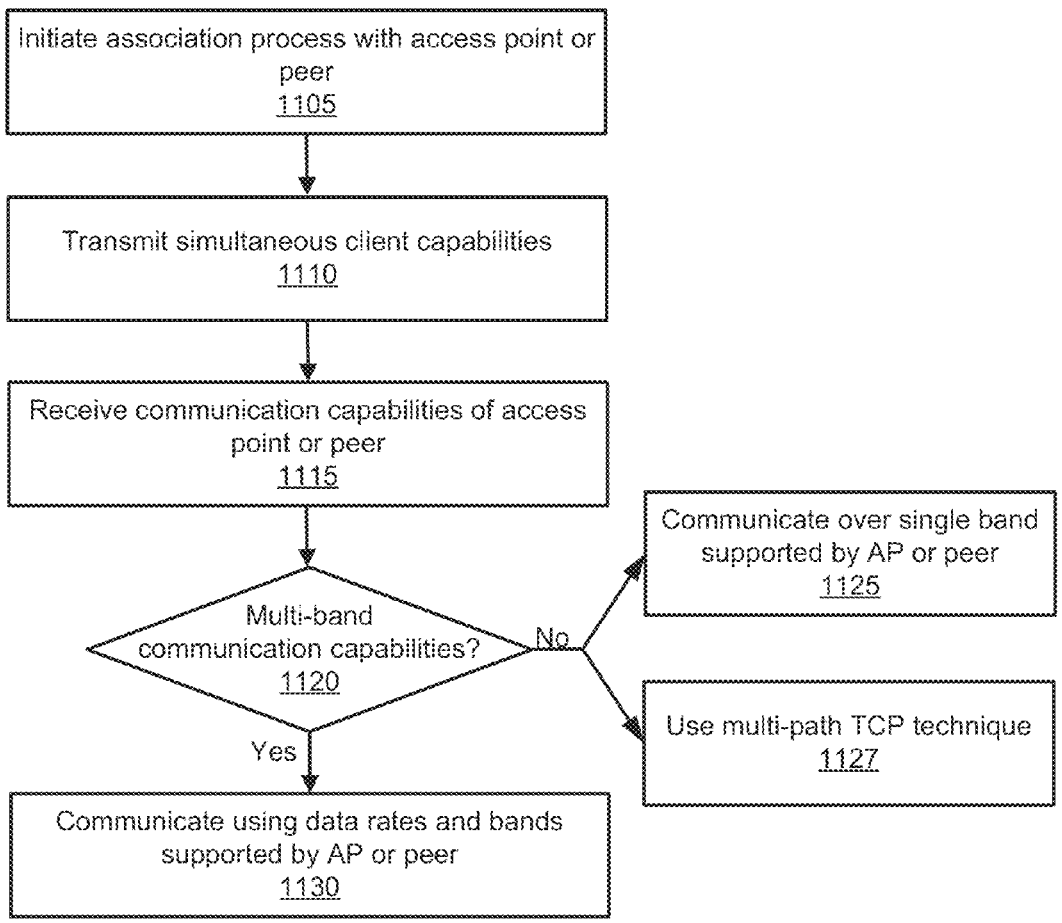
FIG. 11A is a flow diagram illustrating an example process of determining communication capabilities of a wireless device.

FIG. 11A is a flow diagram illustrating an example process of determining communication capabilities of a wireless device. At block 1105, the interface module 424 initiates an association process with an access point or a peer to which the simultaneous client wishes to communicate. Conventionally, an access point periodically transmits beacons that provide information as to the capabilities of the access point, such as supported data rates, supported modes, and country of operation. When communication over multiple bands becomes supported by the access point, additional information may be included in the beacons that specify the bands and/or channels supported by the access point and other information pertaining to simultaneous communication over multiple bands or multiple channels within a band. Similarly, when the simultaneous client wishes to communicate with a peer, an association process can take place between the peers where capabilities pertaining to simultaneous communication over multiple bands are exchanged. Thus, at block 1110, the simultaneous client transmits information about its own multiple band communication capabilities, and at block 1115, the simultaneous client receives information about the access point or peer's communication capabilities, including which bands and/or channels are supported and the respective data rates for those bands and channels.

Then at decision block 1120, the interface module 424 determines from the received information whether the other wireless device has multi-band communication capabilities. If the other wireless device does support communication over multiple bands simultaneously (block 1120—Yes), at block 1130, the interface module 424 provides the information to the load balancing module 422, and the simultaneous client communicates with the other device using the supported modes, data rates and bands. In some embodiments, the interface module 424 selects the bands and channels for communicating with the access point or peer. In some embodiments, the interface module 424 receives the bands and channels selected for communication by the access point or peer.

If the other wireless device does not support communication over multiple bands simultaneously (block 1120—No), there are two options. At block 1125, the interface module 424 can provide the information to the load balancing module 422, and the simultaneous client communicates over the single band supported by the other device. Alternatively, or additionally, the interface module 424 can provide the information to the multipath TCP module 420, and at block 1127, the simultaneous client can communicate over multiple bands to the other device using multipath TCP. Alternatively or in addition, the multipath TCP connection may be with a server in a home or in the cloud that supports multipath TCP. For example, a file may be uploaded or downloaded using a multipath TCP connection to a file server which supports multipath TCP. In some embodiments, a server that supports multipath TCP may be used as an intermediate relay device, which, in turn, transmits the ordered packets to other servers that do not support multipath TCP.

Further, the interface module 424 can manage the use of channels by the simultaneous client with respect to other wireless devices. For example, if the simultaneous client is operated as a soft access point, peer-to-peer device, or WiFi direct device, and a client station wants to connect or associate with the simultaneous communication supporting device, the interface module 424 can determine the communication capabilities of the client station and then send information to the client station to ensure that the client station is using the appropriate communication channel(s). In one scenario, if the client station is not capable of communicating as a simultaneous client, the interface module 424 should transmit information about the channel to be used. And if the quality of that channel deteriorates due to interference or other problems, the interface module 424 should inform the client station that the communications will be moved to a different channel and/or a different band.

Figure 11B:
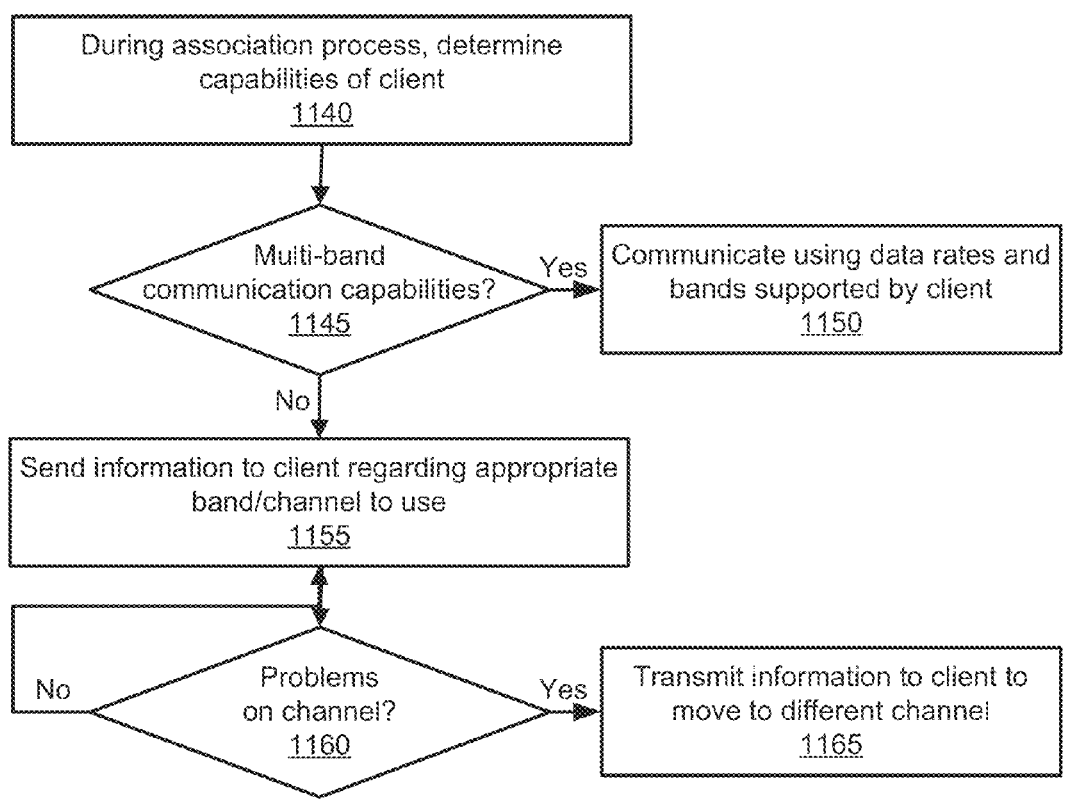
FIG. 11B is a flow diagram illustrating an example process of managing a client station when a simultaneous client is operated as an access point.

FIG. 11B is a flow diagram illustrating an example process of managing a client station when the simultaneous client is operated as an access point. At block 1140, the access point determines the capabilities of the client attempting to associate during the association process.

Then at decision block 1145, the interface module 424 of the access point determines whether the client is capable of operating as a simultaneous client. If the client is able to operate as a simultaneous client (block 1145—Yes), at block 1150, the access point communicates using the data rates and bands supported by the client and additional information, such as the type of link aggregation supported by the access point, how load balancing may be performed, and the type of traffic or packets that should be transmitted on each channel. If the client is not able to operate as a simultaneous client (block 1145—No), at block 1155, the access point transmits information to the client regarding the appropriate channel to use that is supported by the client.

At decision block 1160, the access point determines whether there is a problem with the communication channel. If there are no problems (block 1160—No), the process remains at decision block 1160. If there are problems (block 1160—Yes), the access point attempts to transmit information to the client to move to a different channel.

Some embodiments of the functional processor 405 include the multipath TCP module 420 which modifies conventional TCP (transmission control protocol) so that a standard TCP interface is presented to applications, while the data is spread across several subflows. Multipath TCP is a technique that aggregates throughput over several wireless or wired connections via TCP layer link aggregation. Advantages of using multipath TCP include decreasing download time, decreasing round trip time, and increasing link resilience by improving the loss rate.

Layer 2 link aggregation can also be performed to aggregate throughput over multiple wireless connections, as discussed below, either alternatively, or in addition to multipath TCP. Upper layer link aggregation may also performed, for example, using BitTorrent-type applications, multi-server HTTP (hypertext transfer protocol), peer-to-peer aggregation methods, server-based aggregation methods, or other methods that may be used at the application layer.

Conventional multipath TCP aggregates the use of two different wireless transmission methods, namely, a WLAN link and a cellular link, between a server and a wireless device. In contrast, described herein is the use of multipath TCP over two links of the same type, for example, two WLAN links between two wireless devices. For example, a home access point or home gateway can use multipath TCP to aggregate a link, or two peer clients may use multipath TCP and communicate with each other using soft access point mode, wifi-direct, peer-to-peer, or other some other mode.

Figure 14:
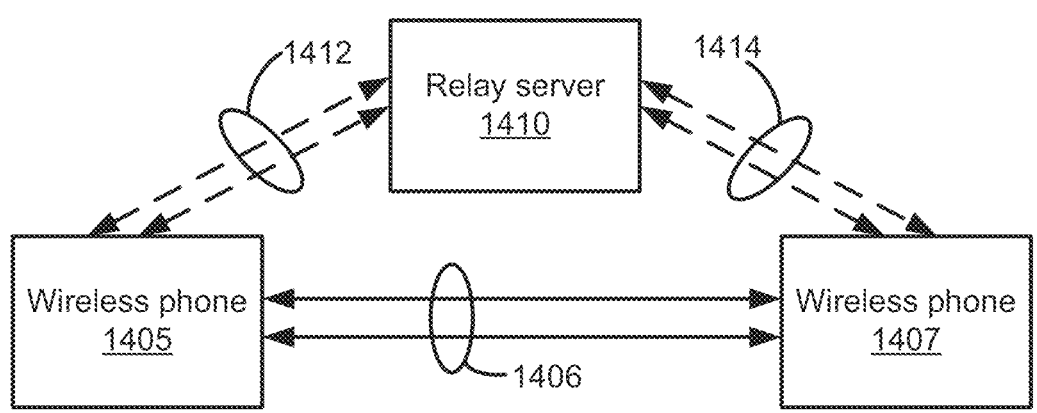
FIG. 14 shows an example block diagram of two wireless devices communicating via a relay server.

As a specific example, FIG. 14 shows a block diagram of multipath TCP connections created between two cellular phones. The two phones, such as iPhones, 1405, 1470 may communicate using an application, such as FaceTime, where both voice and video are transmitted between the two phones 1405, 1407. One of the phones 1405 can identify the location of the other phone 1407 and start sending voice and video traffic directly via multipath TCP 1406 without the use of an intermediate server. However, in some situations, the phones 1405, 1407 may not be able to communicate directly because of the use of filters and blockers in the network. Thus, in this situation, to communicate with each other, the phones 1405, 1407 can use a relay server 1410. Then a first multipath TCP connection 1412 is created between the first phone 1405 and the relay server 1410, and a second multipath TCP connection 1414 is created between the relay server 1410 and the second phone 1407. The use of multipath TCP connections 1406, 1412, 1414 between communicating wireless devices 1450, 1407 creates better quality connections between the devices 1405, 1407.

While the example of wireless phones 1405, 1407 was used in the example of FIG. 14, the concept is equally applicable to other wireless devices, such as gaming devices that have a low latency requirement. For example, if a first game console, such as an Xbox, streams gaming data to a second game console, the game consoles can communicate directly with each other using multipath TCP, or alternatively, they can communicate with a relay server via multipath TCP. In this case, using multipath TCP can help minimize round trip delays in transmissions between the gaming consoles.

Figure 13:
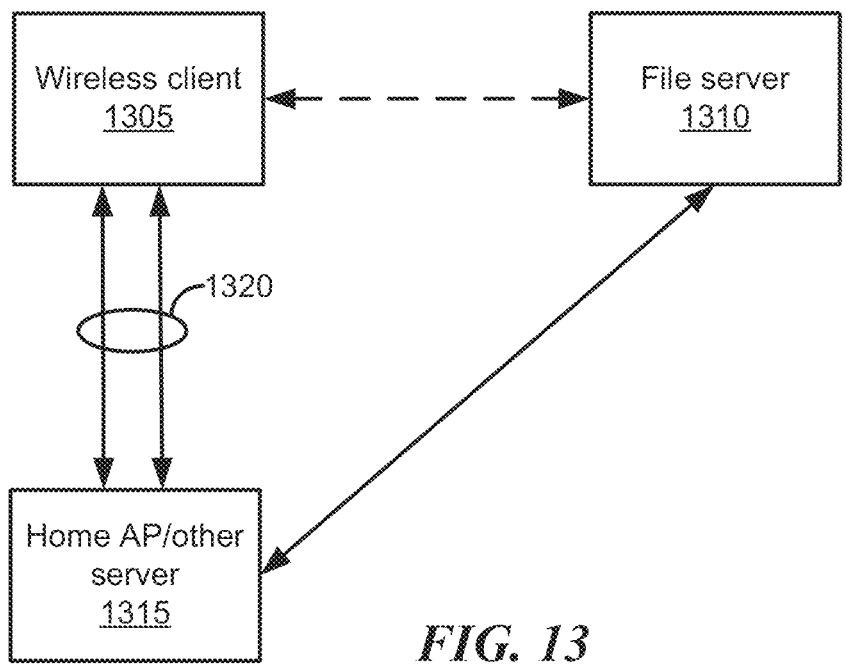
FIG. 13 shows an example block diagram of a wireless device communicating with a server that does not support multipath TCP via a relay server.

Additionally, a multipath TCP connection can be used between one wireless device and a relay server, where the relay server is used to forward data to a server that does not support multipath TCP. For example, as shown in the example scenario in FIG. 13, if a wireless client 1305 wants to connect to a file server 1310 to request a file transfer, and the file server 1310 is not capable of performing multipath TCP, a multipath TCP connection 1320 can be created between the wireless client 1305 and a home access point or a second server 1315 that is capable of supporting multipath TCP. Then the home access point or the second server 1315 acts as a relay and orders the packets received over multipath TCP 1320 before sending the ordered packets down to the next lower layer for transmission to the file server 1310.

When the multipath TCP module 420 initiates a multipath TCP connection with another wireless device by sending a SYN packet, a first flow is established. Each end host is then aware of the other peer's internet protocol (IP) address. When the simultaneous client has another interface available, such as a second WLAN channel, the multipath TCP module 420 notifies the other wireless device of its additional IP address with an Add Address option over the previously established subflow and sends another SYN packet to initiate another connection, along with a JOIN option to the other wireless device's known IP address. With the JOIN option with multipath TCP, the second subflow will be associated with the previously established multipath TCP connection over the WLAN. Because the multipath TCP technique can leverage the TCP handshake, it can bootstrap subflows rapidly, faster than application layer aggregation. In addition, multipath TCP works for all existing TCP applications.

Because many WLAN clients are behind Network Address Translations (NATs), when the simultaneous client has an additional interface, it is difficult for another device to directly communicate with the simultaneous client directly as the NATs typically filter out unidentified packets. The simultaneous client can send an Add Address option on the established subflow to notify the other wireless device of its additional interface. Then as soon as the wireless device receives the Add Address option, it sends out another SYN packet with JOIN option to the simultaneous client's newly notified IP address, along with the exchanged hash key for the new multipath TCP connection to initiate a new subflow.

Each multipath subflow behaves like a legacy TCP flow except for the congestion control algorithms. With multipath subflow, after the three-way handshake is used to establish connections, each subflow maintains its own congestion window and retransmission scheme during data transfer. The congestion control window begins with a slow-start phase that doubles the window per round trip time before entering the congestion avoidance phase.

Some embodiments of the functional processor 405 include the load balancing module 422 that determines how to distribute data packets over the available bands when multiple bands are used by the simultaneous client for communication with one or more wireless devices. The load balancing module 422 may choose which packet is transmitted on which band in a dynamic packet to a packet base, static base, or semi-static base.

The simplest scenario is simply to use one radio operating at one channel or band, and if there is interference or other problems, to switch to a second radio operating at a different channel or band, although, this does method does not take advantage of simultaneous operation over multiple bands.

FIG. 10 is a flow diagram illustrating an example process of moving traffic to a different band. At decision block 1005, the load balancing module 422 determines whether there is a failure or problem with the radio or link being used. If there is no failure or problem (block 1005—No), the process remains at decision block 1005. If there is a failure or problem detected, at block 1010, the load balancing module 422 re-directs packets originally intended to be sent over the problematic link to a different radio. The process then returns to decision block 1005.

In some embodiments, WLAN priority assignments can be used as a guide to selecting bands of operation. For example, voice traffic is assigned the highest priority, video traffic is assigned the next highest priority, best effort traffic is assigned the next highest priority, and background traffic is assigned the lowest priority. For the highest priority traffic, the load balancing module 422 can select the best band at the time for transmitting the traffic, where the best band has the lowest amount of interference. The load balancing module 422 can track and maintain in a memory 490 statistics on the level of noise or interference on each channel in which a wireless module is operating.

In some instances, a certain percentage of available channels and/or bands can be reserved for each priority class of traffic, and the channels can be ranked based upon the most recent throughput data.

In some embodiments, the load balancing module 422 can maintain dedicated channels in certain bands for certain types of traffic. Thus, for example, voice traffic can be assigned to a first channel and band, video traffic can be assigned to a second channel and band, best effort traffic can be assigned to a third channel and band, and background traffic can be assigned to a fourth channel and band. However, based upon operating conditions, traffic can be shifted to other channels and/or bands. For instance, if there is no voice traffic, and there is a high amount of video traffic, the load balancing module 422 can send some of the video traffic over the first channel and band previously reserved for voice traffic. Or the load balancing module 422 can send some of the video traffic over the fourth channel and band previously reserved for background traffic, and the background traffic can be delayed until a later time.

The load balancing module 422 can base band selection on specific requirements for a certain traffic type. For example, if a 10 Mbit/s connection needs to be maintained for video traffic, and the recipient is close to the simultaneous client, a 5 GHz band may be selected. If the recipient moves farther away, one solution is to move to the 2.4 GHz band because it has a larger range. Another solution is to use both bands, so if the 5 GHz band can maintain a transmission throughput of 2 Mbit/s, then the other 8 Mbit/s can be shifted to the 2.4 GHz band.

For some applications, such as gaming or voice over IP (internet protocol), the delay and delay variation requirements are important for the load balancing module 422 to consider. To ensure that delay is minimized, the load balancing module 422 may choose to send multiple copies of the same packet over different bands, and the recipient can combine the packets from the different bands to recover the sequence of packets with a minimum of delay. That is, the best and earliest packet received over the different bands for each of the packets in a sequence can be selected when ordering the sequence of packets. The load balancing module 422 can also attempt to minimize the number of retries for transmitted packets. For each packet that is transmitted by the simultaneous client, the client expects to receive an acknowledgment for that packet. However, if no acknowledgment is received, the packet will be re-transmitted until a maximum number of retries is reached, typically up to six retries are performed. But for delay-sensitive applications, the maximum number of retries may be limited to one or two.

Techniques such as channel coding across channels and bands may also be implemented by the load balancing module 422 to minimize the number of retries. With channel coding, data can be encoded, and different portions of the encoded data can be sent over two or more channels, for example, a first portion of the encoded data can be sent over a first channel and another portion of the encoded data can be sent over a second channel, where the first and second channels can be in the same or different bands. Then at the receiver, a channel decoder is used to combine the information received over the two or more channels. By using channel coding and transmitting different portions of the encoded data via different channels, there is a higher likelihood that the transmitted data can be recovered at the receiver than if the data were sent uncoded via a single channel.

In some instances, because the quality of the wireless channels is continuously changing due to environmental changes, even if there are initially dedicated channels assigned to certain types of traffic, traffic sent over the channels may be shifted when interference arises on one or more of the channels. For example, if the channel dedicated to voice traffic suddenly experiences more path loss, smaller rank, or more noise, the best channel and band dedicated to best effort traffic may be taken over for voice traffic, and the best effort traffic may be shifted to the channel and band previously reserved for the lower priority background traffic.

In some embodiments, channels and bands may be selected by the load balancing module 422 based upon rate versus range data. In some instances, the load balancing module 422 can use all or a subset of its wireless modules to achieve the best overall rate versus range. If the simultaneous client is communicating with more than one wireless device, it may decide to select channels and bands for communication based on the RSSI (received signal strength indicator) and the matrix rank for MIMO devices of each wireless device in each band that is supported. In addition, the RSSI and the quality of service (QoS) requirement of the packets to be transmitted can be used as criteria for selecting bands of operation.

Power consumption considerations may also be taken into account for choosing the channel or channels that are to be used for transmitting data. Power consumption in an idle state is important for battery-operated devices, and thus, the load balancing module 422 may apply methods to minimize the power consumption of a device which is in a low-power state. For example, the control packets or regular keep-alive packets may be transmitted on a band that requires the least power consumption to have the minimum idle power consumption, such as 2.4 GHz or sub-1 GHz bands. But when the device is not in a low-power mode and is transmitting more data, the load balancing module 422 may switch the traffic to a band that has more bandwidth and provides a faster way to perform data exchange, such as the 5 GHz band.

When traffic is moved from one channel to another channel, there is a time cost associated with the channel change. On the recipient's side, many packets may already be buffered, so for example, if the band is changed from the 2.4 GHz band to the 5 GHz band, then the buffer may be flushed, and previously transmitted and buffered data would need to be re-transmitted. Thus, the load balancing module 422 should first determine that there is a minimum margin of improvement before moving from one channel or band to another.

In some embodiments, the load balancing module 422 can decide which channels and bands to use based upon the link conditions (e.g., path loss) for the link on which the packet is being transmitted. For example, if the intended recipient of packets has a good RSSI, the 5 GHz band may be more suitable than the 2.4 GHz band, independent of the type of traffic. Thus, if there is a concurrent or reconfigurable radio that can operate at either 5 GHz or 2.4 GHz or both, the load balancing module 422 can direct the radio to operate at a channel in the 5 GHz band.

In some embodiments, the load balancing module 422 can make a socket-based band selection. A network socket is an endpoint of an inter-process communication flow across a computer network, and a socket address is the combination of an IP address and a port number. Socket differentiation may be performed for different types of sockets, such as datagram sockets for UDP, connection-oriented sockets for TCP and SCTP (stream control transmission protocol), and raw sockets. Then for each socket that is created, the load balancing module 422 can select which channel to use and which stack to use to create that network socket. The decision as to which band is to be used for a socket may be based on the requirements for that socket. For example, during a web browsing session, a TCP socket may be created using HTTP (Hypertext Transfer Protocol) to retrieve data from a server. The web browser may then create a connection to a Google website using the TCP/IP stack on the 2.4 GHz band selected by the load balancing module 422 and then create a connection to the YouTube website to retrieve a video using a TCP/IP stack on the 5 GHz band selected by the load balancing module 422.

Some embodiments of the load balancing module 422 may extend to wireless network link aggregation control protocols for Ethernet as defined in IEEE 802.1ax, IEEE 802.3ad, or other aggregation mechanisms. For example, some standard and proprietary protocols that can be extended include port trunking, link bundling, Ethernet bonding, network bonding, NIC (network interface controller) bonding, and NIC teaming. Link aggregation techniques may be used when both wireless devices that desire to communicate support simultaneous client functionality. These protocols can also be extended to include the following scenarios: when a simultaneous client can associate with another wireless device, but not vice versa; when a simultaneous client loses a connection in the middle of a stream of traffic; when the quality of the connection is very poor on one side; when a simultaneous client places packets with higher priority on the side that has a better channel condition.

Figure 12A:
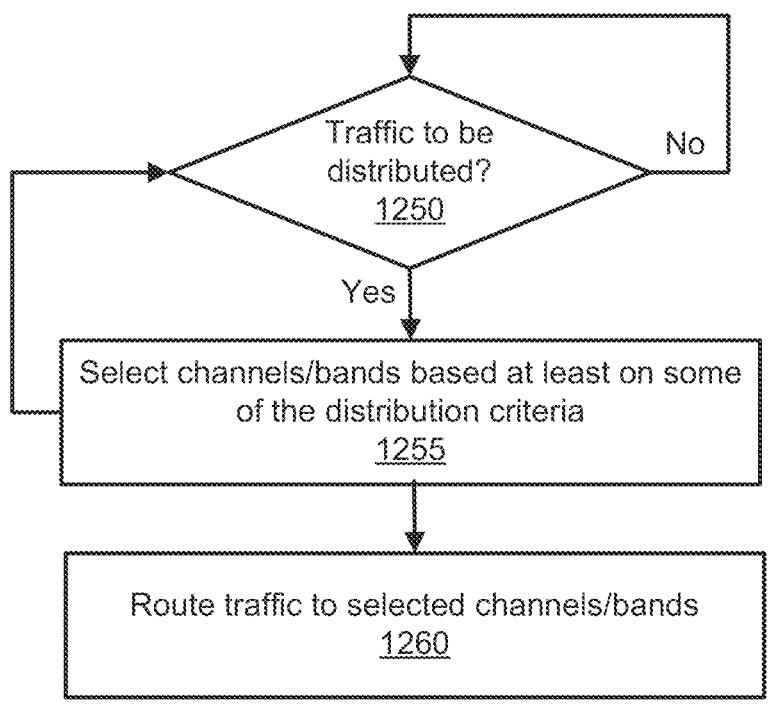
FIG. 12A is a flow diagram illustrating an example process of selecting channels/bands for distribution of traffic in a simultaneous client.

FIG. 12A is a flow diagram illustrating an example process of selecting channels/bands for distribution of traffic in a simultaneous client. At decision block 1250, the load balancing module 422 determines whether there is traffic to be distributed for transmission. If there is no traffic (block 1250—No), the process remains at decision block 1250.

If there is traffic to be distributed (block 1250—Yes), at block 1255, the load balancing module 422 selects the channels/bands for distribution based at least on some distribution criteria. Some of the distribution criteria that the load balancing module 422 considers in selecting channels/bands for traffic and determining whether to move traffic to a different channel/band include, but is not limited to, the priority of the traffic; the requirements of each type of traffic, such as throughput, delay, delay variation, maximum number of retries, and QoS; the path loss, channel rank, or distance of the recipient from the simultaneous client; the level of interference on the channels; the time cost of changing channels; and the RSSI of the current channel.

Then at block 1260, the load balancing module 422 routes the traffic to be distributed to the selected channels/bands.

Figure 12B:
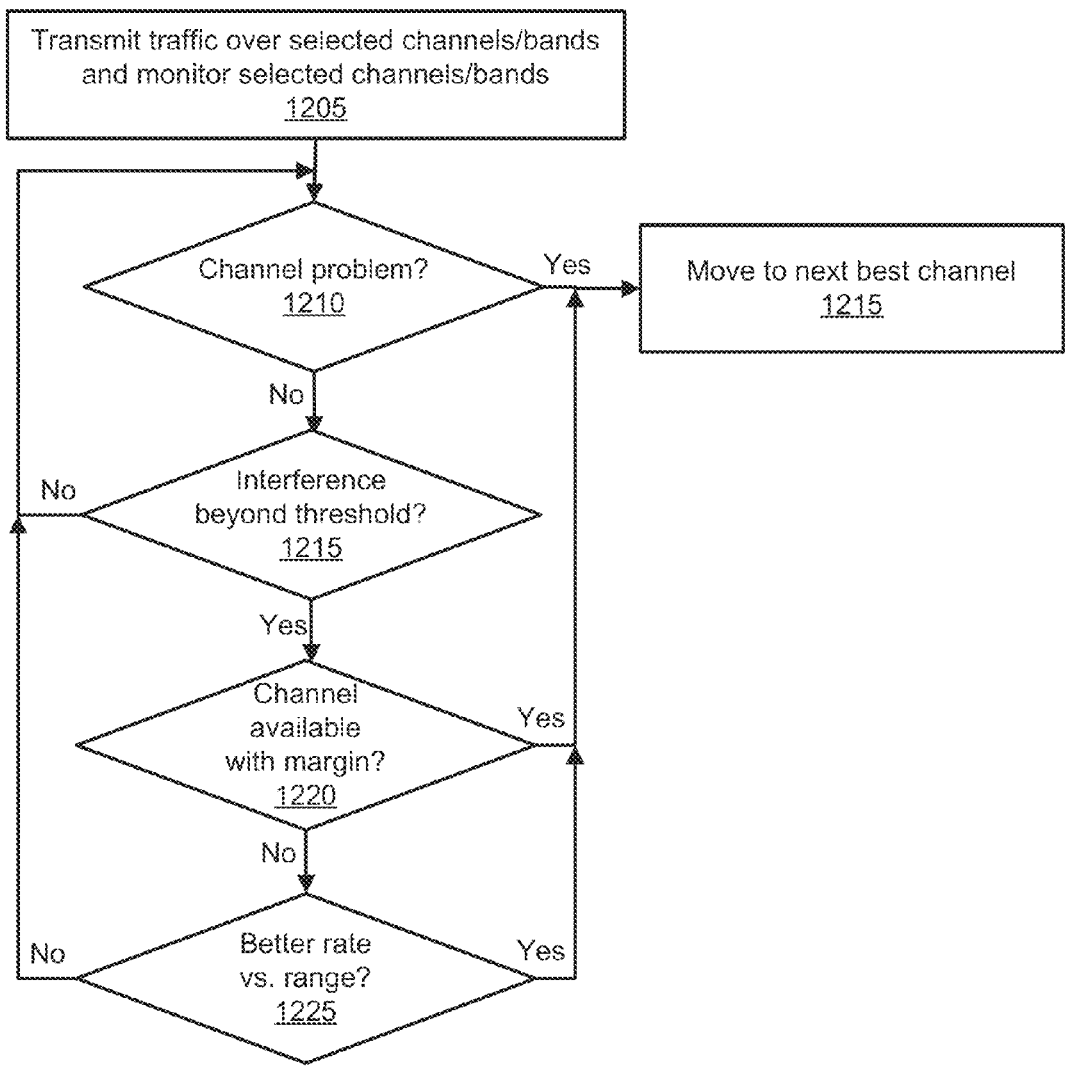
FIG. 12B is a flow diagram illustrating an example process of determining whether to move to another channel or band, once a channel/band has been assigned to traffic by a simultaneous client.

FIG. 12B is a flow diagram illustrating an example process of determining whether to move to another channel or band, once channels and bands have been assigned to traffic by a simultaneous client. At block 1205, the load balancing module 422 transmits traffic over the selected channels/bands and monitors the selected channels/bands.

Then at decision block 1210, the load balancing module 422 determines whether there is a problem with the selected channels/bands. For example, the wireless module may have a failure that prevents it from transmitting and/or receiving packets. If there is a problem (block 1210—Yes), the load balancing module 422 moves the traffic to the next best channel/band.

If there are no problems (block 1210—No), at decision block 1215, the load balancing module 422 determines whether the level of interference on the current channel is beyond a threshold. If the level of interference is not beyond the threshold (block 1215—No), the process returns to decision block 1210.

If the level of interference is beyond the threshold (block 1215—Yes), at decision block 1220, the load balancing module 422 determines whether there is a channel available with a minimum margin of improvement. If there is a channel available (block 1220—Yes), at block 1215, the load balancing module 422 moves the traffic to the next best channel with the minimum margin of improvement.

If there is no channel available with the minimum margin of improvement (block 1220—No), at decision block 1225, the load balancing module 422 determines whether there is a better rate versus range using another channel. If there is a better rate versus range (block 1225—Yes), at block 1215, the load balancing module 422 moves the traffic to the channel that provides the better rate versus range.

If there are no channels that provide a better rate versus range (block 1225—No), the process returns to decision block 1210.

Some embodiments of the functional processor 405 include the layer 2 aggregation/control module 426 that manages functions for the multiple radios in layer 2, such as association, rate control, keeping track of active links, etc. The layer 2 aggregation/control module 426 can perform layer 2 aggregation as well. Packet ordering may be done in layer 2, the TCP layer, or the application layer, and portions of layer 2 can perform part of or all of the process of ordering packets.

Some embodiments of the functional processor 405 include the reconfiguration module 416 that reconfigures one or more reconfigurable wireless WLAN modules to operate in a specific band and/or at a specific channel of the band.

Figure 6A:
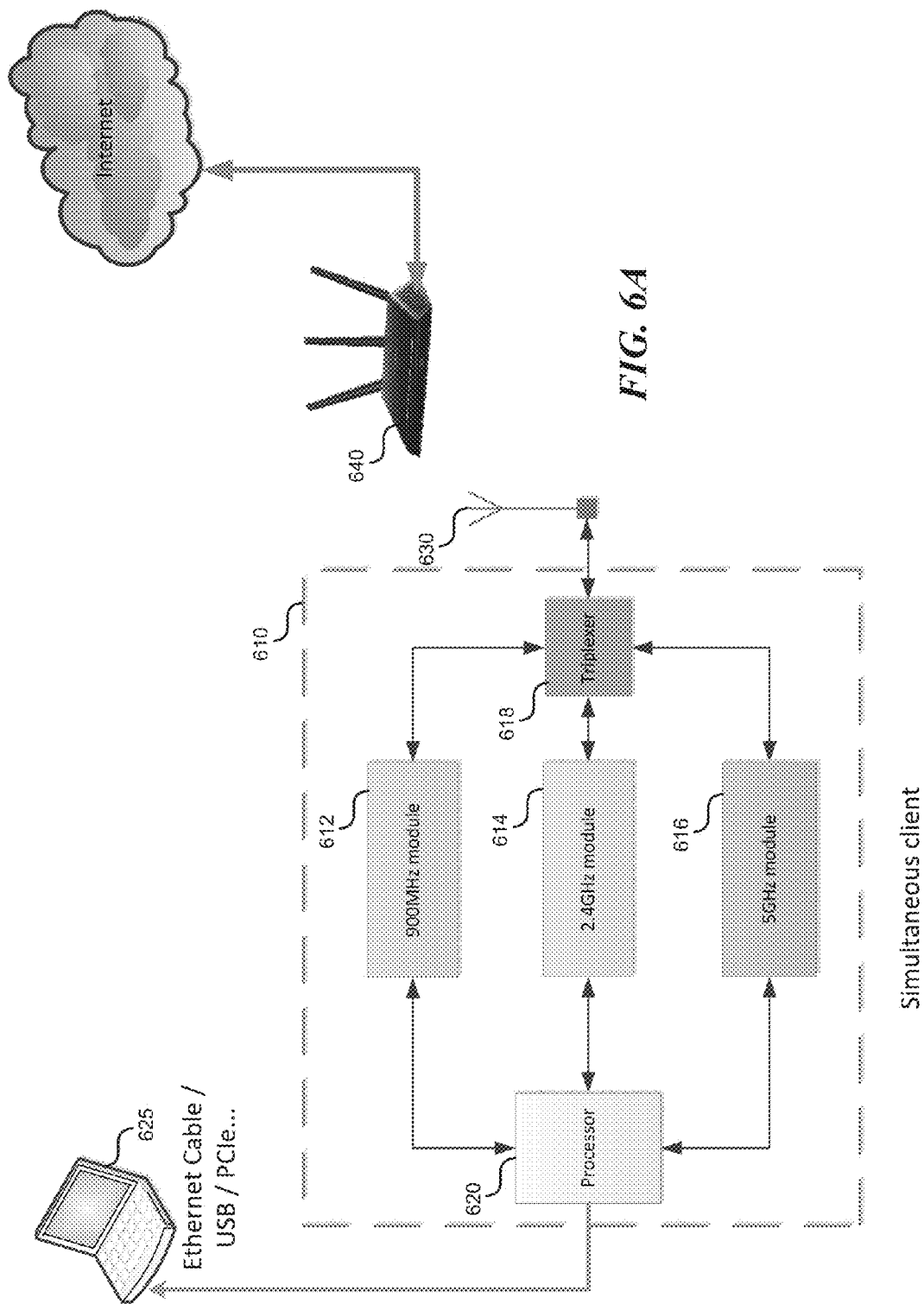
FIG. 6A shows a block diagram of an example front end for a simultaneous client that operates over three different bands simultaneously.
Figure 6B:
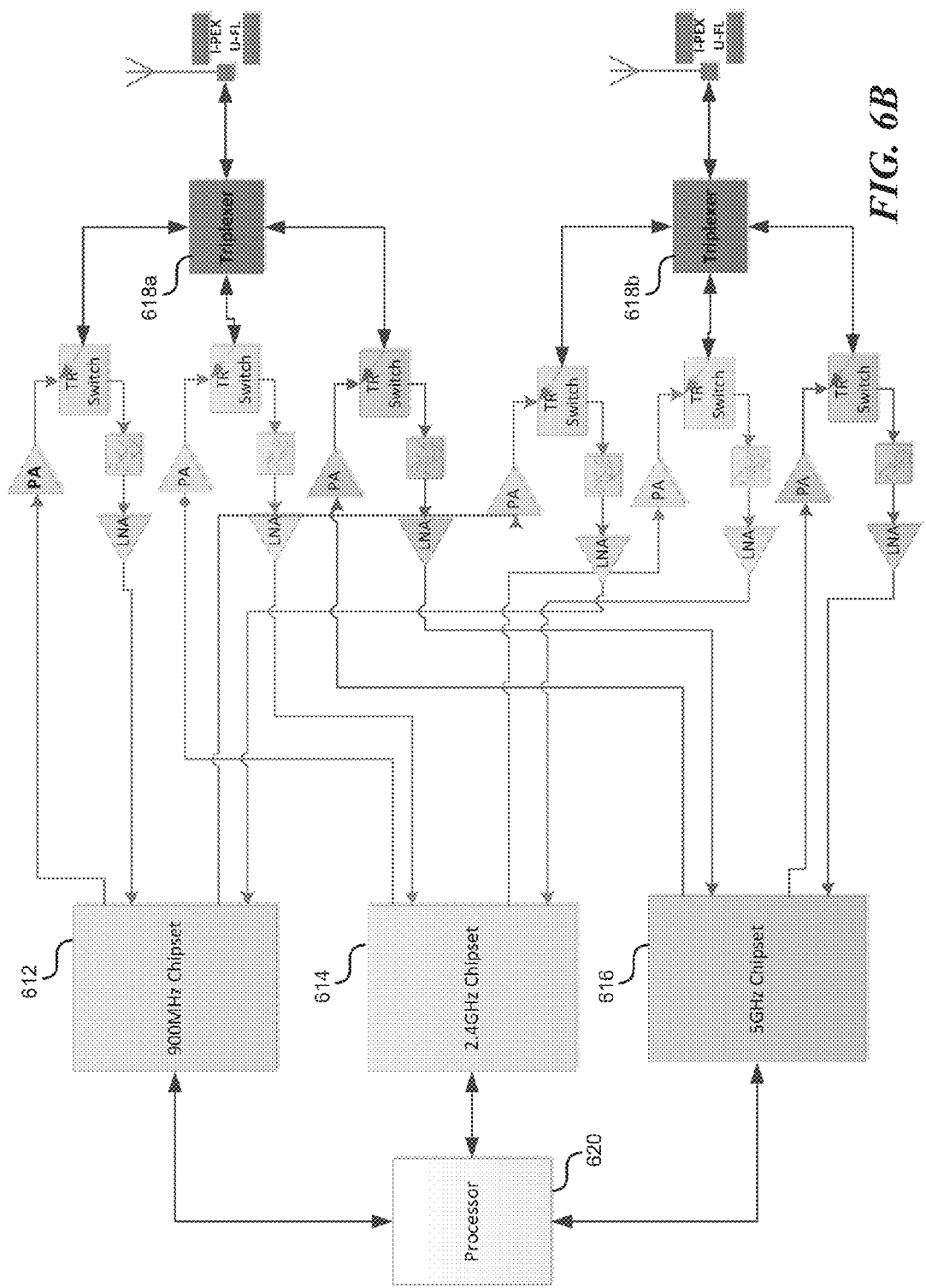
FIG. 6B shows a block diagram of an example front end a simultaneous client having three WLAN chipsets.

Some embodiments of the functional processor 405 include the hardware control module 418 that controls hardware switches that redirect signals to or from antennas, for example, as shown in FIG. 6B and discussed in more detail below.

Alternatively or additionally, the hardware control module 418 can control a hardware switch for directing where a signal that may be used by a cellular radio and/or a simultaneous client, as shown in the example of FIG. 7B and discussed in more detail below.

Some embodiments of the functional processor 405 include the power control module 410. There is a standard, IEEE 802.11ah, that is being developed for low power sensors that uses the sub-1 GHz ISM bands. Low power sensors typically do not need very much bandwidth to transmit data, but they run on batteries and need to conserve power. The IEEE 802.11ah standard is intended to save sensor power rather than provide high performance with high throughput of data, as compared to the IEEE 802.11ac standard defined for the 5 GHz band. Further, because the sub-1 GHz (e.g., 900 MHz) band does not have as much bandwidth as the 2.4 GHz and 5 GHz bands, if a simultaneous client is not transmitting much data, the power control module 410 can direct the data to be transmitted by the WLAN module operating over the sub-1 GHz band using the IEEE 802.11ah protocol to save more power, and when a lot of traffic needs to be sent, it can direct the data to be sent over either the 2.4 GHz or 5 GHz band. The power control module 410 can also use the sub-1 GHz band with the IEEE 802.11ah protocol for control data and the 2.4 GHz or 5 GHz band for transmitting the data itself.

In some embodiments, one or more bands (e.g., sub-1 GHz or 2.4 Hz) may be used as the control channel while one or more bands may be used as the data channel (e.g., 5 GHz or 60 GHz). The channels or bands with less power consumption may be more suitable for control packets.

Figure 9A:
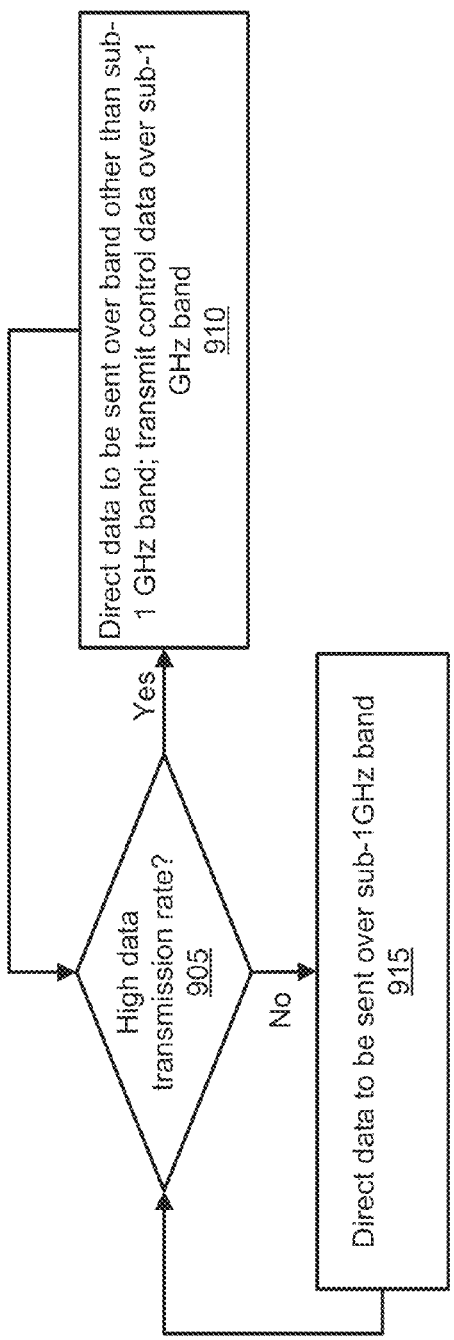
FIG. 9A is a flow diagram illustrating an example process of determining which operating band to use based upon power saving requirements.

FIG. 9A is a flow diagram illustrating a first example process of determining which operating band to use based upon power saving requirements. At decision block 905, the power control module 410 determines whether the rate of data transmission is greater than a predetermined threshold rate. If the transmission rate is high (block 905—Yes), at block 910, the power control module 410 directs the data to be sent over a band other than the sub-1 GHz band. Optionally, the power control module 410 can transmit control data over the sub-1 GHz band. For example, for a monitoring camera for the home, the control packets may be used to initiate video streaming from the camera, while the video stream can be treated as data. Other sensors which capture data from an environment may have control packets that specify, for example, where to capture data or perform a measurement. On a video conference call, control packets can include packets that start a call or update the location of a user, while the actual video conference streaming may be treated as data. The process then returns to decision block 905.

If the transmission rate is not high (block 905—No), at block 915, the power control module 410 directs the data to be sent over the sub-1 GHz (e.g., 900 MHz) band using the IEEE 802.11ah protocol. Then the process returns to decision block 905.

Figure 9B:
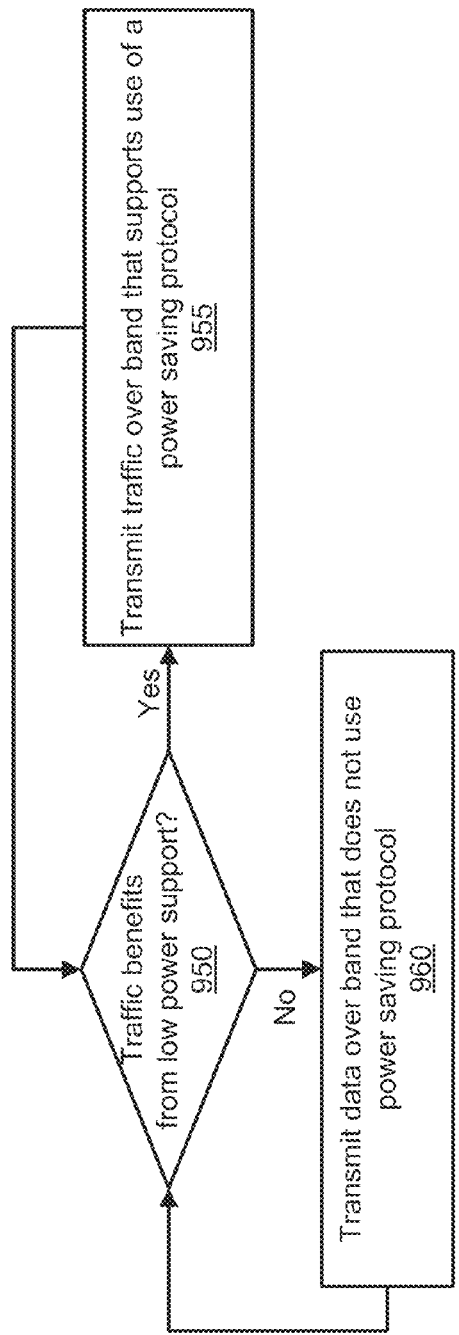
FIG. 9B a flow diagram illustrating a second example process of determining which operating band to use based upon power saving requirements.

FIG. 9B a flow diagram illustrating a second example process of determining which operating band to use based upon power saving requirements. At decision block 950, the power control module 410 determines whether traffic can benefit from low power support. For example, a cell phone may be placed on a channel that has low power support to save battery power, while traffic from a personal computer that is plugged into a wall outlet may not need low power support.

If low power support is needed (block 950—Yes), at block 955, the power control module transmits the traffic over a wireless band, such as the sub-1 GHz band which support use of a power saving protocol, for example, IEEE 802.11ah. If low power support is not needed (block 950—No), at block 960, the power control module transmits the traffic over a different wireless band that does not necessarily use a power saving protocol.

Implementation Models for Layer 2 of the OSI

When the above modules of the functional simultaneous client processor are properly implemented, the conventional IP layer, or layer 3 of the OSI, does not need to be aware of the multiple simultaneous connections that take place in the layer below, i.e., layer 2. There are several different implementation models that can act as an intermediate layer between layer 2 and layer 3. The intermediate layer passes received packets in the correct order up to TCP/IP of layer 3, and packets received from TCP/IP are sent on the appropriate bands selected by the intermediate layer to optimize traffic requirements. Any type of stacks may be used on top of the intermediate layer, such as TCP/IP and UDP (user datagram protocol)/IP. In some embodiments, some or all of the functions of the functional simultaneous client processor can be implemented by modifying the functions performed at layer 3.

Figure 5A:
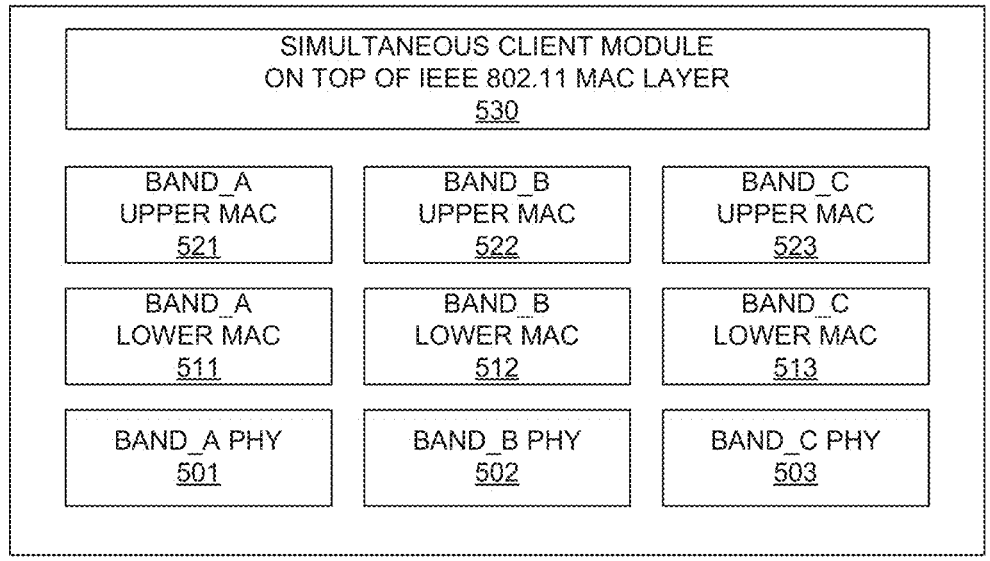
FIG. 5A shows a block diagram of an example implementation model for a simultaneous client software/hardware module that sits on top of a conventional IEEE 802.11 MAC layer and manages the simultaneous connections of three WLAN modules.

FIG. 5A shows a block diagram of a first example implementation model for a simultaneous client software/hardware module 530 that sits on top of a conventional IEEE 802.11 MAC (media access control) layer and manages the simultaneous connections of WLAN modules. In the example implementation shown in FIG. 5A, three standard WLAN core or chipsets perform the communication functions of the MAC and physical (PHY) layers of the OSI, one core/chipset for each of the WLAN modules operating at bands A, B, and C. While three modules for three bands are shown as an example, the implementation model can be adapted for use with any number of modules for two or more bands.

The WLAN module that operates over band A includes software/hardware module 501 that performs the PHY layer functions, software/hardware module 511 that performs the lower MAC layer functions, and software/hardware module 521 that performs the upper MAC layer functions, such as packet ordering, load balancing, etc. The WLAN module that operates over band B includes software/hardware module 502 that performs the PHY layer functions, software/hardware module 512 that performs the lower MAC layer functions, and software/hardware module 522 that performs the upper MAC layer functions. The WLAN module that operates over band C includes software/hardware module 503 that performs the PHY layer functions, software/hardware module 513 that performs the lower MAC layer functions, and software/hardware module 523 that performs the upper MAC layer functions. Thus, each core or chipset implements three layers of software/hardware that perform the communication functions of the PHY layer, the lower MAC layer, and the upper MAC layer.

In this implementation, no changes are made to the functions performed by the PHY layer software/hardware modules 501, 502, 503; the lower MAC layer software/hardware modules 511, 512, 513; or the upper MAC layer software/hardware modules 521, 522, 523. A software/hardware module 530 is added on top of the upper MAC layer that uses an application programming interface (API) to retrieve information from the upper MAC layer modules 521, 522, 523 and to write information back to the upper MAC layer modules 521, 522, 523. Because no changes are made to the existing software/hardware modules 501, 502, 503, 511, 512, 513, 521, 522, 523 of the cores/chipsets, there is less control over these modules than with other implementation models described below.

Figure 5B:
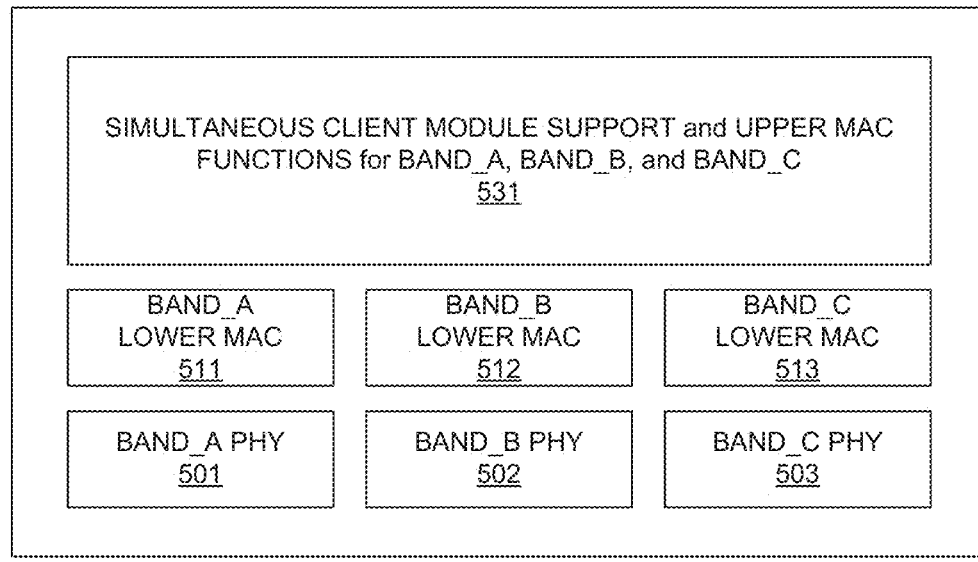
FIG. 5B shows a block diagram of another example implementation model where the communication functions of the upper MAC layer of three bands are merged and provided by the simultaneous client software/hardware module that sits on top of the lower MAC layer and manages the simultaneous connections of three WLAN modules.

FIG. 5B shows a block diagram of another example implementation model where the communication functions of the upper MAC layer of three bands are merged and performed by the simultaneous client software/hardware module 531 that sits on top of the lower MAC layer and manages the simultaneous connections of the three WLAN modules. While three modules for three bands are shown as an example, the implementation model can be adapted for use with any number of modules for two or more bands. The functions of the lower MAC layer and the PHY layer are still performed by the chipsets, and the software/hardware module 531 uses an API to retrieve information from and write information to the lower MAC layer modules 511, 512, 513. As an example, in this implementation, if the upper MAC layer is performed by the host processor, the upper MAC layer can be modified to perform packet ordering, load balancing, and the other functions described above.

To implement the model shown in the example of FIG. 5B, if standard chipsets are used, only the functions performed by software in the upper MAC layer can be merged into the module 531, while hardware in the chipsets still perform their upper MAC layer functions. However, custom hardware/chipsets can be designed such that the hardware/chipsets only perform the functions of the lower MAC and PHY layers, while the upper MAC layer functions performed by the hardware and software of conventional chipsets are merged into module 531.

Figure 5C:
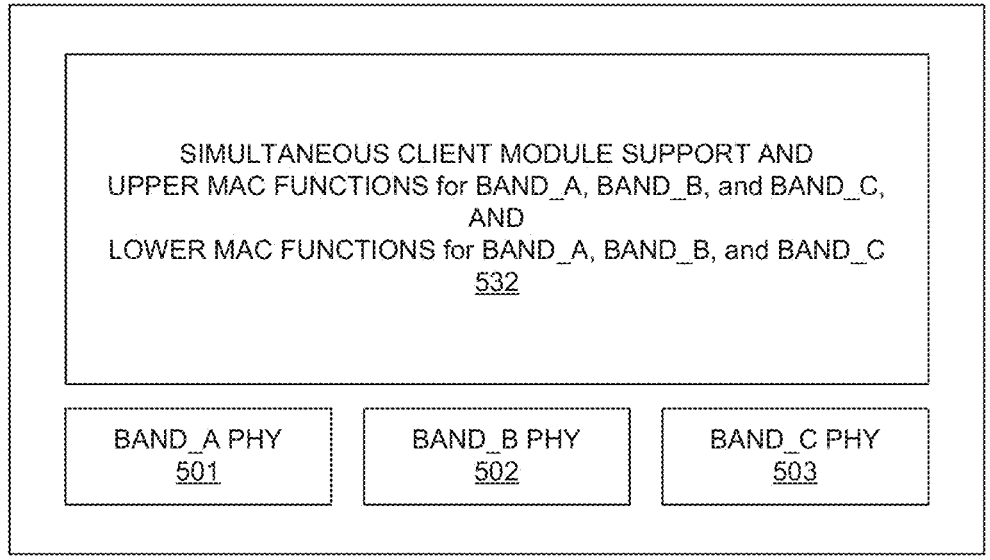
FIG. 5C shows a block diagram of another example implementation model where the communication functions of the upper MAC layer and the lower MAC layer of the three bands are merged and provided by the simultaneous client software module/hardware 532 that sits on top of the PHY layer and manages the simultaneous connections of three WLAN modules.

FIG. 5C shows a block diagram of another example implementation model where the communication functions of the upper MAC layer and the lower MAC layer of the three bands are merged and performed by the simultaneous client software module/hardware 532 that sits on top of the PHY layer and manages the simultaneous connections of three WLAN modules. While three modules for three bands are shown as an example, the implementation model can be adapted for use with any number of modules for two or more bands. The functions of the PHY layer are still performed by the chipsets, and the software/hardware module 532 uses an API to retrieve information from and write information to the PHY layer modules 501, 502, 503.

To implement the model shown in the example of FIG. 5C, if standard chipsets are used, only the functions performed by software in the upper MAC layer and lower MAC layer can be merged into the module 532, while hardware in the chipsets still perform their upper MAC layer and lower MAC layer functions. However, custom chipsets can be designed such that the chipsets only perform the functions of the PHY layer, while the upper MAC layer and lower MAC layer functions performed by the hardware and software of conventional chipsets or cores are merged into module 532.

Figure 5D:
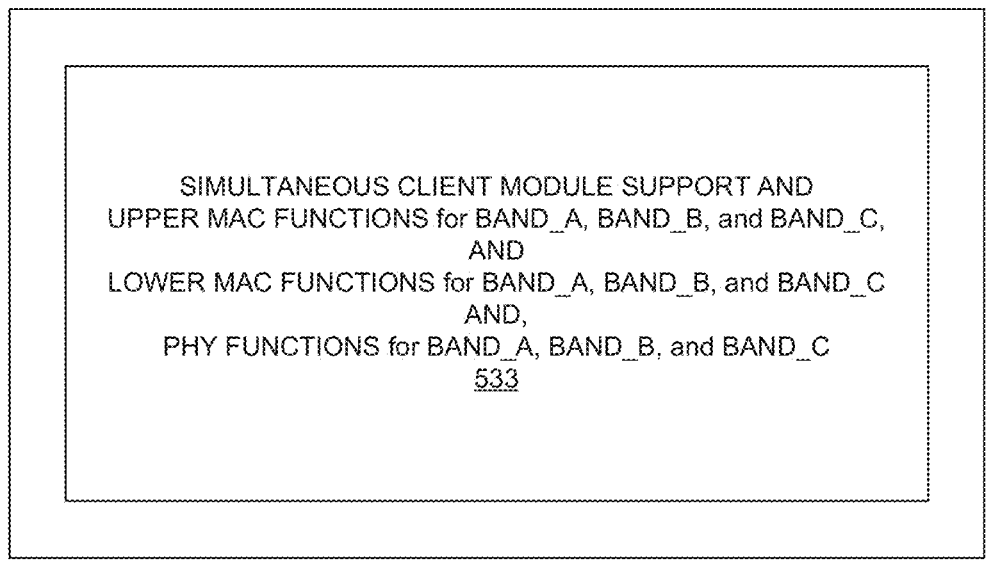
FIG. 5D shows a block diagram of another example implementation model where the communication functions of the upper MAC layer, the lower MAC layer, and the PHY layer of all of the bands are merged and provided by the simultaneous client software/hardware module that manages the simultaneous connections of the three WLAN modules.

FIG. 5D shows a block diagram of another example implementation model where the communication functions of the upper MAC layer, the lower MAC layer, and the PHY layer of all of the bands are merged and performed by the simultaneous client software/hardware module 533 that manages the simultaneous connections of the three WLAN modules. In some embodiments, as part of the PHY layer communication functions performed by the simultaneous client software/hardware module 533, a data payload is transmitted over at least two wireless channels to provide robustness against channel variation, interference, and other factors. In some embodiments, the simultaneous client software/hardware module 533 can be configured to perform channel coding on transmitted symbols of a same packet that is sent over at least two wireless channels. Then a receiver can use a channel decoder on the received packets to combine the information received over the multiple wireless channels. In some embodiments, the simultaneous client software/hardware module 533 can be configured to send multiple copies of a packet over two or more channels or bands. For example, a first copy of a packet can be sent over a first channel, and a second copy of the same packet can be sent redundantly over a second channel.

While three modules for three bands are shown as an example, the implementation model can be adapted for use with any number of modules for two or more bands. All these functionalities may be combined into one chipset or the functionalities could be distributed among more than one chipset.

In some embodiments, each of the above described modules 530, 531, 532, 533 can be performed by a specially designed chipset.

Hardware—Front End

FIG. 6A shows a block diagram of an example front end 610 for a simultaneous client that operates simultaneously over three different bands using a sub-1 GHz (e.g., 900 MHz) module 612, a 2.4 GHz module 614, and a 5 GHz module 616. While three operating bands are shown in the example of FIG. 6A, the simultaneous client can operate using any number of bands, and the bands can include any of the bands that are shown in the example of FIG. 6A, and/or any other bands. In the example of FIG. 6A, the front end 610 is active in more than one band at a time, and can, in some cases, even be active in more than one channel at a time in a band. In some embodiments, a separate front end can be used for each band, and even each channel. However, more components are needed for separate front ends, and as a result, the size of the design is larger and more expensive.

The host processor (not shown) in the host platform 625 communicates with the processor 620 in the simultaneous client 610. In the example of FIG. 6A, the simultaneous client 610 is external to the host platform 625, but the simultaneous client 610 can also be implemented internally to the host platform 625. Each of the three WLAN modules 612, 614, 616 provide an input into a triplexer 618 that multiplexes the inputs, and the output of the triplexer 618 is sent to the antenna 630 for transmission to the access point 640.

Hardware—Antennas

The antenna 630 used in a simultaneous client 610 can include one or many antennas. To reduce the total number of antennas needed for a simultaneous client, and thus, to reduce the form factor of the simultaneous client, multiband antennas that are resonant at more than one band can be used.

For personal computers, laptops, tablets, and cell phones, examples of types of multiband antennas that can be used include PIFA antennas (planar inverted-F antennas), meander line monopole antennas, chip antennas, and patch antennas. The advantages of a PIFA antenna are a small size, an omnidirectional radiation pattern, low cost, and high efficiency. With a meander line monopole antenna, a small form factor is an advantage. These types of antennas are presently used in personal computers as dual band antennas that can transmit at either 2.4 GHz or 5 GHz. Dual band antennas have a single feed and components that are resonant at each of the selected bands. Thus, they can transmit at both bands simultaneously. These antennas can be designed to have components that resonate at more than two bands simultaneously as well.

Ultra wideband (UWB) antennas are antennas that resonate over a range of frequencies, although the radiation pattern created by a UWB antenna changes as a function of frequency. UWB antennas have a large size so they are mostly useful for outdoor applications for simultaneous clients. Examples of UWB antennas include bowtie antennas, horn antennas, Vivaldi antennas, and spiral antennas. Bowtie antennas have a simple structure and so are easy to manufacture, and have an omni-directional radiation pattern which is useful for multi-point connections. While horn antennas may be more expensive and more difficult to manufacture, horn antennas are directional so they can be useful for point-to-point applications. Vivaldi antennas also have a simple structure, similar to bowtie antennas, however, Vivaldi antennas are directional, and thus useful for point-to-point applications. Spiral antennas are large, have circular polarization, have high gain, and are directional in opposing directions.

Conventional cell phones that operate over multiple cellular bands can use an active matching antenna that is adjustable to be resonant at a particular frequency and has a small form factor. As a cell phone is only used on a single cellular band at a time, an active matching antenna is a good choice for cell phones. However, the widely used active matching antennas may only be useful for single band usage, not simultaneous multiple band usage. A block diagram of the antennas of a cell phone is shown in FIG. 7A, where both a WiFi or WLAN antenna 710 and a 2G/3G/LTE antenna 720 are used in a cell phone, but not simultaneously. The WLAN antenna operates at either the 2.4 GHz band or the 5 GHz, and the 2G/3G/LTE antenna operates at the 900 MHz band.

Because a simultaneous client necessarily operates at two or more bands simultaneously, the active matching antenna on its own will not be sufficient for a simultaneous client. However, as shown in the example block diagram of FIG. 7B, an active matching antenna can be multiplexed with a multiband antenna, such as a chip antenna or meander line antenna, to provide the functionality needed for a simultaneous client. In some embodiments, the simultaneous client can operate simultaneously in three bands: 2.4 GHz, 5 GHz, and sub-1 GHz. Current multiband chip antennas 710 are available that resonate at 2.4 GHz and 5 GHz, even though the chip antennas are not currently used to resonate at these bands simultaneously. Additionally, a cellular antenna 720 can be used for the sub-1 GHz (e.g. 900 MHz) band. The outputs of the multiband antenna 710 and the cellular antenna 720 can be multiplexed together by a multiplexer 715, resulting in operation as a tri-band module for the simultaneous or concurrent client 715.

The cellular antenna 720 can play a dual role. In the first role, the cellular antenna 720 can be used as an antenna just for a cellular radio 730. In this role, the switch/splitter 722 is adjusted to connect the cellular antenna 720 to the cellular radio 730. A switch can be used if the cellular radio and the concurrent client do not operate at the same time. Alternatively, in the second role, the cellular antenna 720 sends a signal to both the cellular radio 730 and the simultaneous client 705. The switch/splitter 722 is used as a splitter can be used to divide the signal from the cellular antenna 720 and sends part of the signal to both the cellular radio 730 and the simultaneous client 705. The portion of the signal intended for the simultaneous client 705 is first coupled to an active matching circuit 724 that tunes the resonant frequency of the cellular antenna 720 to the appropriate channel frequency in the sub-1 GHz (e.g., 900 MHz) band for use with the simultaneous client 705. In this way, the frequency at which the simultaneous client 705 operates can be different from the frequency at which the cellular phone operates. When the output of the actively matched antenna is multiplexed with the output of the dual band WLAN antenna 710, a tri-band antenna is available for use with the simultaneous client 705. While the three specific bands 5 GHz, 2.4 GHz and sub-1 GHz (e.g., 900 MHz) were described with respect to FIG. 7B because components operating in these bands are readily available, any other bands can be used with the multiplexing technique.

As an alternative to the multiband antenna solutions discussed above, one or more single band antennas can be used for each band for a simultaneous client. This solution may be preferable because the multiband antennas' radiation pattern changes as a function of frequency, and using single band antennas will provide a better radiation pattern with more consistency across the bands. However, using single band antennas optimized for each band takes up more space and may be more expensive, although this solution may be feasible for large clients.

Hardware—Amplifiers

FIG. 6B shows a block diagram of an example implementation of a simultaneous client having three WLAN chipsets, where each chipset performs the functions of a WLAN module, as described above. Each of the WLAN chipsets 612, 614, 616 operates in a different band and can transmit packets and receive packets. On the transmission side for each band, there is a power amplifier (PA) that amplifies the signal to be transmitted, and on the receiving side, there is a bandpass filter and a low noise amplifier (LNA) that amplifies the received signal before sending it to the appropriate chipset.

In some embodiments, a wideband amplifier can be used to amplify two or more channels in the same band, or even two or more channels in multiple bands. The wideband amplifier can be used to replace two or more power amplifiers and/or two or more low noise amplifiers.

Hardware—Frequency Filters

One or more frequency filters may need to be used in a simultaneous client to prevent interference between modules operating in the same band and between modules operating in different bands.

Interference may arise between modules operating in different bands if a harmonic of the frequencies in one band are close to the frequencies in a second band. For example, if the simultaneous client operates in the 2.4 GHz band and the 5 GHz band simultaneously, the second harmonic of transmissions in the 2.4 GHz band are at 4.8 GHz, which is very close to the 5 GHz band. Thus, the transmissions at the 2.4 GHz band should be filtered to prevent the transmissions from saturating the receiver at the 5 GHz band. Additionally, transmissions at the 5 GHz band may have unwanted noise or scattering that generates interference in the 2.4 GHz band. Consequently, transmissions at the 5 GHz band should be filtered to protect communications at the 2.4 GHz band.

For a band that has a fairly large bandwidth, such as the 5 GHz band, modules can operate at multiple frequencies within the band if the frequencies are sufficiently far apart. For example, if the bandwidth of each frequency is 80 MHz, a first 80 MHz channel can be used in the low frequency range of 5 GHz and a second 80 MHz channel can be used in the high frequency range of 5 GHz. By using filtering between these two frequency bands, communications at the different channels can operate without influencing each other. While a similar technique can be used with a band that is relatively narrow, such as the 2.4 GHz band, the filter requirements needed to prevent interference between frequencies used in the 2.4 GHz band are more stringent, and thus more expensive.

Frequency filters that can be used to prevent interference between modules operating in different bands or even between modules operating in the same band can use one or more bandpass filters, low pass filters, and high pass filters. Examples of types of filters that can be used include, but are not limited to, micro strip filters, ceramic filters, low temperature co-fired ceramic (LTCC) filters, surface acoustic wave (SAW) filters, bulk acoustic wave (BAW) filters, film bulk acoustic resonator (FBAR) filters, cavity filters, and waveguide filters.

Methods and systems for simultaneously using multiple WLAN modules operating in different channels and/or bands have been described. As used herein, the terms "connected," "coupled," or any variant thereof means any connection or coupling, either direct or indirect, between two or more elements. It will be appreciated by those of ordinary skill in the art that the concepts and techniques described herein can be embodied in various specific forms without departing from the essential characteristics thereof. The presently disclosed embodiments are considered in all respects to be illustrative and not restrictive. The scope of the embodiments indicated by the appended claims, rather than the foregoing description, and all changes that come within the meaning and range of equivalence thereof are intended to be embraced.

What is claimed is:

1. A method performed by a first wireless device comprising:
   determining multiband communication capabilities of a second wireless device, wherein the capabilities includes wireless channels and bands supported by the second wireless device;
   upon determining that the second wireless device is capable of multiband communication, determining the plurality of wireless channels and bands for communicating based on at least wireless channels and bands supported by the first wireless device and the second wireless device;
   sending information to the second device regarding the plurality of wireless channels and bands to be used for communicating; and
   communicating with the second wireless device simultaneously over the plurality of wireless channels and bands using a local area network protocol;
   wherein determining the plurality of wireless channels and bands for communicating is further based on specific requirements for traffic to be communicated, and further wherein the specific requirements include ensuring a number of retries for retransmitting unacknowledged packets is less than a specific number, and further wherein communicating with the second wireless device comprises channel coding across selected wireless channels.

2. The method of claim 1, further comprising:
   upon determining that the second wireless device is not capable of multiband communication, communicating with the second device using a single channel and band supported by the second wireless device.

3. The method of claim 1, further comprising:
   communicating with the second device using multipath TCP (transmission control protocol).

4. The method of claim 1, wherein the specific requirements include maintaining or exceeding a target throughput.

5. The method of claim 4, wherein communicating with the second wireless device comprises sending a first portion of the traffic to be communicated over a first wireless channel and sending a second portion of the traffic to be communicated over a second wireless channel to maintain or exceed the target throughput.

6. The method of claim 1, wherein the specific requirements include meeting a delay specification.

7. The method of claim 6, wherein communicating with the second wireless device comprises sending multiple copies of each packet over two or more wireless channels simultaneously.

8. The method of claim 1, wherein determining the plurality of wireless channels and bands for communicating is further based on specific requirements for traffic to be communicated, and further wherein the specific requirements include meeting a delay variation specification.

9. The method of claim 1, wherein the specific requirements include meeting an overall rate versus range specification.

10. The method of claim 1, wherein the specific requirements include meeting a quality of service requirement.

11. The method of claim 1, wherein determining the plurality of wireless channels and bands for communicating is further based on a received signal strength indicator of the plurality of wireless channels and bands.

12. The method of claim 1, wherein determining the plurality of wireless channels and bands for communicating is further based on a matrix rank for multiple input multiple output devices for each device in each band the device supports.

13. The method of claim 1, wherein determining the plurality of wireless channels and bands for communicating is further based on path loss for the wireless channels.

14. The method of claim 1, wherein determining the plurality of wireless channels and bands for communicating is further based on a socket-based band selection.

15. The method of claim 1, wherein determining the plurality of wireless channels and bands for communicating is further based on a range of the supported wireless bands.

16. The method of claim 1, wherein communicating with the second wireless device simultaneously over the plurality of wireless channels and bands comprises:
   receiving and buffering a plurality of packets from the second wireless device, wherein the plurality of packets are received over the plurality of wireless channels, and further wherein the receiving takes place at a first layer of the network;
   reading a sequence number in a header of each of the plurality of packets;
   ordering the buffered packets according to the sequence numbers;
   passing the ordered packets to a next higher layer of the network.

17. The method of claim 1, wherein communicating with the second wireless device simultaneously over the plurality of wireless channels and bands comprises:
   inserting a sequencing number in a header of each packet in a plurality of packets to be transmitted;
   transmitting a first subset of the plurality of packets over a first one of the plurality of wireless channels to a second wireless device;
   transmitting a second subset of the plurality of packets over a second one of the plurality of wireless channels to the second wireless device.

18. The method of claim 1, further comprising:
   upon determining a problem with transmitting or receiving traffic over one of the plurality of wireless channels, moving the traffic from the one of the plurality of wireless channels to a different one of the plurality of wireless channels.

19. The method of claim 1, further comprising:
detecting and monitoring a level of interference on the plurality of wireless channels;
determining whether an alternate channel of the plurality of wireless channels is available with a lower level of interference for an identified channel of the plurality of channels;
moving the traffic to the alternate channel if an improvement in the level of interference between the identified channel and the alternate channel is greater than a margin, wherein the margin is based on retransmission time on the alternate channel of previously transmitted and buffered traffic on the identified channel.

20. A method performed by a first wireless device comprising:
determining multiband communication capabilities of a second wireless device, wherein the capabilities includes wireless channels and bands supported by the second wireless device;
upon determining that the second wireless device is capable of multiband communication, determining the plurality of wireless channels and bands for communicating based on at least wireless channels and bands supported by the first wireless device and the second wireless device;
sending information to the second device regarding the plurality of wireless channels and bands to be used for communicating;
communicating with the second wireless device simultaneously over the plurality of wireless channels and bands using a local area network protocol;
detecting and monitoring a level of interference on the plurality of wireless channels;
determining whether an alternate channel of the plurality of wireless channels is available with a lower level of interference for an identified channel of the plurality of channels; and
moving the traffic to the alternate channel if an improvement in the level of interference between the identified channel and the alternate channel is greater than a margin, wherein the margin is based on retransmission time on the alternate channel of previously transmitted and buffered traffic on the identified channel.

* * * * *